(12) United States Patent
Small et al.

(10) Patent No.: US 7,494,961 B2
(45) Date of Patent: Feb. 24, 2009

(54) POLYPHENOLICS AS LUBRICANT OIL ADDITIVES

(75) Inventors: Vernon R. Small, Hercules, CA (US); Jesse Meyer, Pinole, CA (US)

(73) Assignee: Chevron Oronite Company LLC, San Ramon, CA (US)

( * ) Notice: Subject to any disclaimer, the term of this patent is extended or adjusted under 35 U.S.C. 154(b) by 718 days.

(21) Appl. No.: 10/880,703

(22) Filed: Jun. 29, 2004

(65) Prior Publication Data

US 2005/0288194 A1   Dec. 29, 2005

(51) Int. Cl.
*C10M 159/12* (2006.01)
*C10M 159/16* (2006.01)
*C07C 229/00* (2006.01)

(52) U.S. Cl. ............ 508/542; 508/453; 508/454; 508/457; 508/476; 560/145

(58) Field of Classification Search .......... 508/542, 508/453, 454, 457, 476
See application file for complete search history.

(56) References Cited

U.S. PATENT DOCUMENTS

| | | | |
|---|---|---|---|
| 2,717,263 A | 9/1955 | McKinney et al. | |
| 3,966,621 A | 6/1976 | Watkins et al. | |
| 3,980,569 A * | 9/1976 | Pindar et al. | 508/542 |
| 4,116,936 A | 9/1978 | Steiner | |
| 4,216,099 A | 8/1980 | Steckel | |
| 4,225,502 A | 9/1980 | Gaudette et al. | |
| 4,387,244 A | 6/1983 | Scanlon et al. | |
| 4,454,059 A * | 6/1984 | Pindar et al. | 508/542 |
| 4,655,949 A | 4/1987 | Landry et al. | |
| 4,734,212 A | 3/1988 | Harrison | |
| 5,024,773 A | 6/1991 | Liston | |
| 5,039,437 A | 8/1991 | Martella et al. | |
| 5,043,086 A | 8/1991 | Blain et al. | |
| 5,082,470 A | 1/1992 | Martella et al. | |
| 5,118,875 A | 6/1992 | Martella et al. | |
| 5,371,140 A | 12/1994 | Parks | |
| 5,529,705 A | 6/1996 | Small, Jr. et al. | |
| 5,620,949 A | 4/1997 | Baker et al. | |
| 5,808,145 A | 9/1998 | LeCoent et al. | |
| 6,001,785 A | 12/1999 | LeCoent et al. | |
| 6,028,039 A | 2/2000 | Cane et al. | |
| 6,262,001 B1 | 7/2001 | LeCoent et al. | |

* cited by examiner

*Primary Examiner*—Ellen M. McAvoy
(74) *Attorney, Agent, or Firm*—Joseph P. Foley; Nirav Patel; Claude J. Caroli

(57) ABSTRACT

A process for preparing an oligomeric phenolic detergent composition comprising contacting an oil soluble alkylphenol with an alkaline earth metal base, an alpha amino acid, and a $C_1$ to $C_6$ aldehyde, in the in the presence of a $C_2$ to $C_6$ alkylene glycol and a $C_2$ to $C_4$ carboxylic acid; and reacting under reactive conditions at a temperature of from 150° C. to 225° C. The oligomeric phenolic detergent product can be employed in a lubricating oil.

27 Claims, No Drawings

POLYPHENOLICS AS LUBRICANT OIL ADDITIVES

FIELD OF THE INVENTON

The present invention relates to a process for oligomerizing a substantially salified alkylphenol with an alpha amino acid via a condensation reaction with a formaldehyde component in the presence of a suitable promoter system. The resulting oligomeric alkylphenolic composition or overbased oligomeric alkylphenolic composition is useful as a detergent for lubricating oils.

BACKGROUND OF THE INVENTION

Since World War II, metalated sulfurized alkylphenols have formed one of the backbones of lubricating oil detergent chemistry. Such chemicals have mostly one sulfur atom linking two and sometimes more alkylphenol units. In the absence of carbonation, the TBNs of these materials are generally 80-150BN.

As a class, metalated sulfurized alkylphenols have provided deposit inhibition and base for neutralizing the acids of combustion. Now, however, due to environmental concerns and legislative efforts, it is desirable to limit the amount of sulfur in lubricating oils and lubricating oil additive components, thus necessitating the development of sulfur free versions of these important detergents. In addition, there is a need to introduce some ashless base since high ash has proven to be problematic for certain catalyst systems.

It has now been discovered that use of alpha amino acids such as glycine and alanine together with alkylphenol, an alkaline earth metal base and a source of formaldehyde at high temperatures in the presence of certain polar catalysts and co-solvents afford oligomeric structures which are sulfur free with a corresponding metal-based TBN from about 100 to about 150BN, and furthermore which have significant ashless base due to the basic nitrogen of the alpha amino acid. The alpha amino acid is thought to be ionically attached to the phenolic oxygen via a calcium bridge as evidence by the fact that the alpha amino acid and its nitrogen is lost following acidification and water wash. This ionically attached nitrogen is in contradiction with the formation of a Mannich reaction as disclosed for example in U.S. Pat. Nos. 2,717,263 and 4,655,949.

SUMMARY OF THE INVENTION

In one aspect, the present invention relates to a process for oligomerizing an alkylphenol, particularly a substantially salified alkylphenol with an alpha amino acid via a condensation reaction with a formaldehyde component in the presence of a suitable promoter to prepare a substantially sulfur free oligomeric alkylphenolic composition, which beneficially has significant ashless base due to the basic nitrogen of the alpha amino acid. The resulting oligomeric alkylphenolic composition can be further overbased, and both oligomeric alkylphenolic compositions are useful detergents for lubricating oils. Thus, one embodiment is directed to a process for preparing an oligomeric alkylphenolic detergent composition comprising contacting an oil soluble alkylphenol with an alkaline earth metal base, an alpha amino acid, and a $C_1$ to $C_6$ aldehyde, in the in the presence of a $C_2$ to $C_6$ alkylene glycol and a $C_2$ to $C_4$ carboxylic acid; and reacting under reactive conditions at a temperature of from 150° C. to 225° C.

The order of reactants can have some effect as to the yield and distribution of the particularly oligomerized alkylphenolic product. Thus another embodiment is directed to first contacting an oil soluble alkylphenol with an alkaline earth metal base and an alpha amino acid, in the in the presence of a $C_2$ to $C_6$ alkylene glycol and a $C_2$ to $C_4$ carboxylic acid; and reacting under reactive conditions at a temperature of from 150° C. to 225° C. to form an intermediate product; and contacting the intermediate product with a $C_1$ to $C_6$ aldehyde and reacting under reactive conditions at a temperature of from 150° C. to 225° C. Alternatively, the process comprises first contacting an oil soluble alkylphenol with an alkaline earth metal base, in the in the presence of a $C_2$ to $C_6$ alkylene glycol and a $C_2$ to $C_4$ carboxylic acid; and reacting under reactive conditions at a temperature of from 150° C. to 225° C. to form an intermediate product; and contacting the intermediate product with a $C_1$ to $C_6$ aldehyde and an alpha amino acid, and reacting under reactive conditions at a temperature of from 150° C. to 225° C. Another embodiment comprises first contacting an oil soluble alkylphenol with an alkaline earth metal base and a $C_1$ to $C_6$ aldehyde, in the in the presence of a $C_2$ to $C_6$ alkylene glycol and a $C_2$ to $C_4$ carboxylic acid; and reacting under reactive conditions at a temperature of from 150° C. to 225° C. to form an intermediate product; and contacting the intermediate product with and an alpha amino acid and reacting under reactive conditions at a temperature of from 150° C. to 225° C. The alpha amino acid can be added with additional $C_1$ to $C_6$ aldehyde.

In yet another aspect, an unsulfurized phenate detergent can replace or supplement the one made previously insitu. Thus, the present invention is directed to a process for preparing an oligomeric phenolic detergent composition comprising contacting an oil soluble alkaline earth metal phenate, an alpha amino acid, and a $C_1$ to $C_6$ aldehyde, in the in the presence of a $C_2$ to $C_6$ alkylene glycol and a $C_2$ to $C_4$ carboxylic acid; and reacting under reactive conditions at a temperature of from 150° C. to 225° C.

The resulting oligomeric alkylphenolic compositions correspond to having a metal-based TBN from about 100 to about 150BN and can be further overbased to provide higher TBN values. Therefore, another aspect of the present invention is directed to overbasing the oligomeric phenolic detergent (produced either in the single step of the two step reaction process) via carbonation.

Another aspect of the present invention is directed to the product produced by the process disclosed herein as well as lubricating oil compositions employing the oligomeric alkylphenolic composition as well as species of the reaction product which may have undergone further separation processes. Thus, these oligomeric alkylphenolic compositions can be employed in an oil of lubricating viscosity. Therefore another embodiment is directed to a lubricating oil composition comprising a major amount of an oil of lubricating viscosity; and an oligomeric phenolic detergent composition prepared by contacting an oil soluble alkylphenol with an alkaline earth metal base, an alpha amino acid, and a $C_1$ to $C_6$ aldehyde, in the in the presence of a $C_2$ to $C_6$ alkylene glycol and a $C_2$ to $C_4$ carboxylic acid; and reacting under reactive conditions at a temperature of from 150° C. to 225° C.; a dispersant; and a wear inhibitor.

Among other factors, the present invention is directed to the unexpected discovery that sulfur free oligomeric alkylphenolic compositions employing the alpha amino acid provide for oligomerization of alkylphenols provide for an improved degree of oligomerization incorporating from 2 to about 6 alkylphenol moieties without a dramatic loss of the incorporated metal. The oligomerized alkylphenolic compositions can be incorporated in fully formulated lubrication oil compositions and provide improved deposit prevention performance in comparison to conventional detergents.

DETAILED DESCRIPTION

Prior to discussing the invention in further detail, the following terms will be defined. As used herein, the following terms have the following meanings unless expressly stated to the contrary:

The term "Group II metal" or "alkaline earth metal" means calcium, barium, magnesium, and strontium.

The term "calcium base" refers to a calcium hydroxide, calcium oxide, calcium alkoxide and the like and mixtures thereof. The term "lime" refers to calcium hydroxide also known as slaked lime or hydrated lime. Barium, magnesium and strontium bases are likewise defined.

The term "Total Base Number" or "TBN" refers to the amount of base equivalent to milligrams of KOH in 1 gram of sample. Thus, higher TBN numbers reflect more alkaline products and therefore a greater alkalinity reserve. The TBN of a sample can be determined by ASTM Test No. D2896 or any other equivalent procedure.

The term "overbased oligomeric alkylphenolic composition" refers to a composition comprising a small amount of diluent (e.g., lubricating oil) and a metal oligomeric alkylphenolic additive or complex wherein additional alkalinity is provided by a stoichiometric excess of a metal oxide, hydroxide or $C_{1-6}$ alkoxide based on the amount required to react with the hydroxide moiety of the alkylphenol.

The term normal "oligomeric alkylphenolic composition" refers to a metal oligomeric alkylphenolic additive or complex which contains approximately a stoichiometric amount of metal required to neutralize the hydroxy substituent—in the case of alkaline earths, this is 0.5 mole metal per alkylphenol; in the case of alkali, it is equimolar. Such compositions are actually basic and typically exhibit a TBN of about 50 to 150 and are useful to neutralize engine acids.

The term "high TBN, overbased oligomeric alkylphenolic composition" refers to overbased alkaline earth metal oligomeric alkylphenolic compositions having a TBN of about 225 to 350. Generally, a carbon dioxide treatment is required to obtain high TBN in what is believed to be a complex with a colloidal dispersion of calcium carbonate.

The term "lower alkanoic acid" refers to alkanoic acids having 1 through 3 carbon atoms, i.e., formic acid, acetic acid and propionic acid and mixtures thereof.

The term "oil solubility" means that the additive has a solubility of at least 50 grams per kilogram and preferably at least 100 grams per kilogram at 20° C. in a base 10W40 lubricating oil.

The term "alkylphenol" and "alkylphenyl" refers to a phenol group having one or more alkyl substituents at least one of which has a sufficient number of carbon atoms to impart oil solubility to the resulting phenate additive.

The term "polyol promoter" refers to a compound having two or more hydroxy substituents, generally the sorbitol type, for example, alkylene glycols and also derivatives thereof and functional equivalents such as polyol ethers and hydroxycarboxylic acids.

The alkylphenols of this invention are generally of the formula:

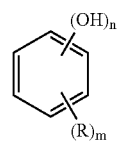

formula I wherein R is alkyl from 6 to 40 carbon atoms, m and n are integers independently selected from one and two; whereby R is selected for suitable length and/or branching so that the resulting alkylphenol is oil soluble. Preferably m and n are one.

Oil solubility for the alkylphenol may be provided by a single long chain alkyl substitute or by a combination of alkyl substituents including branch chain alkyl groups. Typically, the alkylphenol used in the present process will be a mixture of different alkylphenol, e.g., linear and/or branched chain alkyl groups where both linear and branched chain alkyl having a distribution of alkyl groups as opposed to a single isomer. Particularly preferred alkyl groups are mixtures of the above and have an average number of carbons between about 12 and 28. Thus, the alkylphenols may contain up to 100% linear alkyl groups, up to 100% branched alkyl groups or be a mixture of branched and linear alkyl groups. Typically, only a minor amount of dialkylate is employed. Preferably, the dialkylate ranges from 0 wt % to less than 25 wt % and more preferably less than 10 wt % and more preferably 0 wt % to about 5 wt % of the initial alkylphenol charge.

Branched alkylphenols can be obtained by the reaction of phenol with a branched olefin containing 9 to 24 carbon atoms and more preferably 9 to 15 carbon atoms, said olefin generally originating from propylene. These branched alkylphenols typically consist of a mixture of monosubstituted alkylphenol isomers with the great majority of the branched alkyl substituent being in the para position, with very few being in the ortho position, and even fewer substituents in the meta position. This distribution makes the resulting alkylphenol relatively more reactive towards an alkaline earth metal base, since the phenol function is practically devoid of steric hindrance. Additionally, a large portion of meta substituted phenols can limit the oil solubility of the resulting oligomeric product.

Linear alkylphenols can be obtained by reaction of phenol with a linear olefin, generally originating from ethylene. Preferably, the linear olefin or blend of linear olefins, are terminal olefins, as contrasted to internal olefins. The preferred linear olefins are alpha olefins fractions having a major amount of n-alpha olefins. As used herein, major amount refers to greater than about 50 wt % n-alpha olefin, and preferably greater than about 80 wt %. Linear olefins are capable of attaching to the benzene ring so that the alkyl group is essentially linear. The term essentially linear means greater than 50 mole % of the alkyl groups on the alkylated phenol are alpha methyl substituted linear alkyl groups. The preferred linear alkylphenols consist of a mixture of monosubstituted isomers in which the proportion of linear alkyl substituents is primarily in the ortho and para positions. Preferably the ortho and para positions of the linear alkyl group are at least 80 wt %, and more preferably at least 85 wt % and even more preferred at least 90 wt % of the linear alkylphenol product. Particularly preferred are linear alkylphenol products which have a high para content of preferably greater than 30 wt % and more preferably greater than 40 wt %. Examples of the alpha-olefins include 1-octene, 1-nonene, 1-decene, 1-dodeoene, 1-tridecene, 1-tetradecene, 1-pentadecene, 1-hexadecene, 1-heptadecene, 1-octadecene, 1-nonadecene, 1-eicosene, 1-heneicosene, 1-docosene, 1-tetracosene, etc. Commercially available alpha-olefin fractions that can be used include the $C_{15-18}$ alpha-olefins, $C_{12-16}$ alpha-olefins, $C_{14-16}$ alpha-olefins, $C_{14-18}$ alpha-olefins, $C_{16-18}$ alpha-olefins, $C_{16-20}$ alpha-olefins, $C_{18-24}$ alpha-olefins, $C_{20-24}$ alpha-olefins, $C_{22-28}$ alpha-olefins, $C_{24-28}$ alpha-olefins, $C_{26-28}$ alpha-olefins, etc. The linear alkylphenols contain an alkyl group of from 12 to 40 carbon atoms, more preferably from 18 to 20 carbon atoms with a predominate distribution of 20 to 28 carbon atoms. This $C_{20-28}$ mixture may contain a minor amount of lower and higher olefins which account for less than 10 mole % of the total mixture.

Where branch chain products are desired, it is economically advantageous to use 100% polypropenyl substituted phenol because of its commercial availability and generally lower costs. However, due to resulting viscosity concerns, preferably about 25 to 75 mole percent of the alkylphenol will have straight-chain alkyl substituent of from 20 to 28 carbon atoms and from about 75 to 25 mole percent in which the alkyl group is polypropenyl of from 9 to 18 carbon atoms. More preferably about 35 to 65 mole percent of the alkylphenol will be a straight-chain alkyl of about 20 to 28 carbon atoms and about from 65 to 35 mole percent of the alkylphenol will have the branched chain alkyl group of from 9 to 18 carbon atoms. The use of an increasing amount of predominantly straight chain alkylphenols results in products generally characterized by lower viscosities. On the other hand, while polypropenylphenols are generally more economical than predominantly straight chain alkylphenols, the use of greater than 75 mole percent polypropenylphenol in the preparation of oligomeric alkylphenolic compositions generally results in products of undesirably high viscosities. However, use of a mixture of from 75 mole percent or less of polypropenylphenol of from 9 to 18 carbon atoms and from 25 mole percent or more of predominantly straight chain alkylphenol of from 20 to 28 carbon atoms allows for more economical products of acceptable viscosities. Particularly preferred molar ratios are about 70/30 of the branched to linear alkylphenol or approximately about a 50/50 mass ratio.

Preferably, the alkylphenols are para- or ortho-substituted alkylphenols. It is believed that p-alkylphenols react more efficiently and facilitate the preparation of longer chain. Where longer chain oligomers are desired (based upon the total charge) the alkylphenol is preferably predominantly para alkylphenol with no more than about 45 mole percent of the alkylphenol being ortho alkylphenols; and more preferably no more than about 35 mole percent of the alkylphenol is ortho alkylphenol. Alkyl-hydroxy toluenes or xylenes, and other alkylphenols having one or more alkyl substituents in addition to at least one long chained alkyl substituent can also be used, but these would tend to shorten the oligomer chains due to the lack of reactive sites.

Additional information regarding the selection and preparation of suitable alkylphenols can be had for example from U.S. Pat. Nos. 5,024,773; 5,320,763; 5,318,710; and 5,320,762, all of which are hereby incorporated by reference in their entirety.

The alkylphenols of this invention may have two hydroxy groups on the benzene ring and thus be selected from alkyl catechol, alkyl resorcinol, and alkyl hydroquinone. Particularly preferred are monoalkyl catechols which are normally liquids and derived from an olefin having 14 to 18 and 18 to 24 carbon atoms. Detailed description to the preparation of these alkyl cathechols are described in U.S. Pat. Nos. 4,632,771 and 4,463,838 incorporated herein by reference. In addition, these nonalkylated analogues are useful: catechol, resorcinol, and hydroquinone. However, these nonalkylated analogues should not constitute over 30 mole percent of the total phenolic charge; more preferable less than 10 mole percent, and most preferable, less than 5 mole percent of the total phenolic charge.

The alpha amino acid of this invention is of the general formula $H_2NCR_1R_2COOH$, wherein $R_1$ is hydrogen or lower alkyl eg. $C_1$ to $C_6$ alkyl, and more preferably $R_1$ is hydrogen; $R_2$ may be hydrogen, $C_1$ to $C_{40}$ alkyl, lower alkyl eg $C_1$ to $C_6$ alkyl, hydroxyalkyl, thioalkyl, phenylalkyl, or other organic group. While equal molar charges of alkylphenol to alpha amino acid can be employed, particularly preferred molar charges are 1:0.25-0.75, more preferably from 1:0.30-0.65 and even more preferably 1:0.45-0.50. By way of illustration, the following list contains the particularly preferred alpha amino acids wherein $R_1$ is hydrogen and $R_2$ is selected from the group consisting of:

TABLE 1

| $R_2$ Radical Group | Common Name |
|---|---|
| H— | glycine |
| $CH_3$— | alanine |
| $CH_3CH_2CH(CH_3)$— | isoleucine |
| $(CH_3)_2CHCH_2$— | leucine |
| $HO—CH_2$— | serine |
| $CH_3CH(OH)$— | threonine |
| $HSCH_2$— | cysteine |
| $CH_3SCH_2CH_2$— | methionine |
| $H_2NCOCH_2$— | asparagine |
| $H_2NCOCH_2CH_2$— | glutamine |
| $HOOCCH_2$— | aspartic acid |
| $HOOCH_2CH_2$— | glutamic acid |
| $(CH_3)_2CH$— | valine |
| $H_2N—(CH_2)_4$— | lysine |
| $H_2N—CH_2CH(OH)CH_2CH_2$— | hydroxylysine |
| $HN=C(NH_2)—NH—(CH_2)_3$— | arginine |
| (benzyl)—$CH_2$— | phenylalanine |
| $HO$—(phenyl)—$CH_2$— | tyrosine |
| (imidazolyl)—$CH_2$— | histidine |
| (indolyl)—$CH_2$— | tryptophan |

Particularly preferred amino acids comprise one or more of the amino acids of the general formula above or one or more of the specific listed amino acids above, with glycine and alanine being particularly preferred. However, if additional ashless base is desired, then preferably the amino acid is a basic acid selected from the group consisting of histidine, lysine and arginine. Additionally, acidic amino acids may be selected for additional ash containing base and such acidic amino acids are selected from the group consisting of aspartic acid and glutamic acids.

Although the amino acids are commonly shown as containing an amino group and a carboxyl group, $H_2NCR_2COOH$, certain properties, both physical and chemical are not consistent with this structure; for example in contrast to amines and carboxylic acids, the amino acids are non-volatile crystalline solids with acidity and basicity constants low for the —COOH and —$NH_2$ groups, they are typically insoluble in non-polar solvents and appreciable soluble in water, their aqueous solutions behave more like solutions of substances of high dipole moment. Many of these observations are consistent with a predication of the amino acid having a unique dipolar ion structure.

The alkaline-earth metal bases that can be used for carrying out this step include the oxides or hydroxides of calcium, magnesium, barium, or strontium, and particularly of calcium oxide, calcium hydroxide, magnesium oxide, and mixtures thereof. In one embodiment, slaked lime (calcium hydroxide) is preferred.

The process of the present invention uses a mixture of a $C_2$ to $C_4$ carboxylic acid and a $C_2$-$C_4$ alkylene glycol employed to promote and enhance the reaction of the alkaline-earth metal base with the alkylphenol. It has been discovered that improved metal base incorporation and reduced crude sediment of the resulting oligomeric alkylphenolic composition can be obtained when the reaction proceeds in the presence of a carboxylic acid, preferably, a $C_2$ to $C_4$ carboxylic acid with a $C_2$-$C_4$ alkylene glycol. It is believed that the $C_2$ to $C_4$ carboxylic acid with a $C_2$-$C_4$ alkylene glycol promoter system may act as transfer agent, assisting the transfer of the alkaline-earth metal bases from a mineral reagent to an organic reagent. Formic acid has been found to be detrimental to this procedure. More preferably, a $C_2$ to $C_4$ carboxylic acid is selected from acetic, propionic and butyric acid; and the $C_2$-$C_4$ alkylene glycol is selected from ethylene glycol, propylene glycol and butane-diol, particularly butane-2,3-diol. These carboxylic acids and/or alkylene glycols may be used either singly or in mixtures. Preferably acetic acid is employed with ethylene glycol. As stated above, mixtures of carboxylic acids may also be employed and mixtures of glycols may be used.

In conjunction with the promoter or mixture of promoters above, a high molecular weight alkanol can be employed as a cosolvent. These high molecular weight alkanols are straight and branched chain alkyl containing 8 to 16 carbon atoms, preferably 9 to 15 carbon atoms. When employed, the alkanol is typically employed at a molar charge of from about 0.5 to 2.5 moles preferably, from about 0.6 to 1.5 moles and more preferably about 0.8 to 1 mole of high molecular alkanol per mole of alkylphenol. Examples of suitable alkanols include 1-octanol, 1-decanol (decyl alcohol), 2-ethyl-hexanol, and the like. Particularly preferred is 2-ethyl-hexanol. It is beneficial to use a high molecular weight alcohol in the process because it acts as a solvent and also forms an azeotrope with water and hence affords a convenient way to remove the water generated by the neutralization or any other water in the system, by azeotropic distillation either after or preferably during the reaction. The high molecular weight alcohol may also play some part in the chemical reaction mechanism in the sense that it facilitates the removal of the byproduct water during the reaction, thus pushing the reaction to the right of the reaction equation.

The aldehyde component of this invention is a $C_1$-$C_6$ aldehyde. Accordingly the aldehyde is selected from formaldehyde, acetaldehyde, propionaldehyde, butyraldehyde, 2-methyl-propionaldehyde, 2-methyl-butyraldehyde, 3-methyl-butyraldehyde, 2,3-dimethyl-butyraldehyde, 3,3-dimethyl-butyraldehyde, pentanal, and methyl substituted pentanal. Preferably, the aldehyde is a formaldehyde component. Formaldehyde is available is many forms for example as a solid, liquid or gas. Particularly preferred is paraformaldehyde (which is a solid typically a powder or flaked product containing the equivalent of about 91% to 93% formaldehyde). Trioxane a crystalline solid may be employed (trioxane is the cyclic trimer of formaldehyde). However liquid formaldehyde solutions may also be employed, formalin solutions (aqueous solutions of formaldehyde, sometimes in methanol, in 37%, 44%, or 50% formaldehyde concentrations are commonly used forms) also formaldehyde may be in an aqueous solutions. Additionally, formaldehyde is also available as a gas. For material handling purposes and to minimize additional polishing steps later on, the particularly preferred formaldehyde component is paraformaldehyde. Other aldehydes such as acetaldehyde, glycoxal, and furaldehyde may be employed and more preferably in small amounts with the formaldehyde component and typically these other aldehydes make up no more than 10% of the total formaldehyde charge.

The present process can be conveniently conducted by contacting the desired alkylphenol, more preferably mixtures of alkylphenols, with an alkaline earth metal base, an alpha amino acid and a formaldehyde component in the presence of a promoter under reactive conditions and at a temperature of from 150° C. to 225° C., preferably in an inert compatible liquid hydrocarbon diluent. Preferably the reaction is conducted under an inert gas, typically nitrogen. Particularly preferred reaction temperatures are from 170° C. to 200° C., with higher temperature following reaction for distillation, typically distillation temperature are from 210° C. to 250° C., at equivalent atmospheric pressure to remove water of reaction process water and light fractions, with 215° C. to 225° C. distillation temperatures being particularly preferred. Sufficient alkaline earth base is added to the charge of alkylphenol to thereby salify the alkylphenols; thus, substantially forming alkylphenol salts. By substantially forming alkylphenol salts means about 50 mole % or greater of the alkylphenols have been converted into the corresponding salt, preferably greater than 75 mole %, more preferably greater than 90 mole %, and even more about 95 up to 100 mole % of the alkylphenol has been converted to a salt. Particularly preferred are calcified alkylphenols. Stated in another fashion, preferably the molar charge is one alkylphenol, and about 0.5 mole or greater and up to about 1.5 mole of one or more alkaline earth metal bases; with preferred molar charge of alkylphenol to alkaline metal earth base from 1:0.65-1.0 and particularly preferred ratio of from 1:0.75-0.85.

The amino acid is thought to act as a stabilizer for the alkylphenol and/or alkylphenol salt as well as an oligomerization aide for linking the alkylphenol component with the aldehyde. Additionally, in the final product, the alpha amino acid is a source of ashless base. While equal molar charges of alkylphenol to alpha amino acid can be employed, particularly preferred charges are 1:0.25-0.75, more preferably 1:0.30-0.65, and even more preferably 1:0.40-0.50. The oligomerized product is formed by the addition of the aldehyde, preferably a formaldehyde component and most preferably paraformaldehyde, which serves to bridge the alkylphenol salts. Particularly preferred molar charges of alkylphenol to the formaldehyde component are 1:0.55-1.5, preferably 1:0.65-1.1, and most preferably 1:0.70-1.0 of alkylphenol to formaldehyde. While not being bound to any theory regarding this reaction, illustrated below is a schematic that the reaction is thought to proceed.

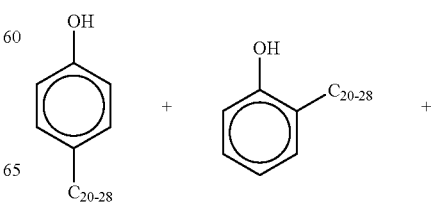

-continued

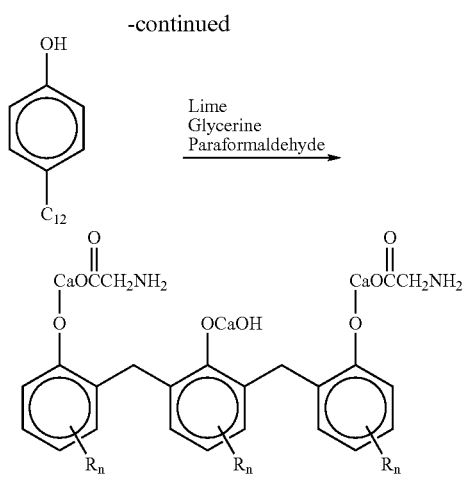

Although presented as a single product in the above schematic, the oligomeric alkylphenolic reaction product is a mixture of linked phenolic moieties. Particularly preferred compositions have greater than about 20 mass percent of a three linked phenolic product or higher, preferably greater than 40 mass percent with greater than about 50 mass percent of the three linked phenolic product or higher, in the total oligomeric alkylphenolic reaction product. If desired, the oligomeric alkylphenolic reaction product can undergo processing such as filtration to remove solids as well as other separation processes to concentrate these higher oligomeric products. Suitable separation techniques are known in the art and can include but are not limited to distillation, solvent extraction, membrane separation and the like.

The reactions of this invention may be carried out in the absence of a diluent, but it is often convenient to use a suitable diluent, typically a substantially inert organic diluent such as mineral oil, neutral oil or an alcohol, ether or the like, such diluents include benzene, toluene, xylene, paraffin, and the like. Particularly preferred diluents are lubricating oils which include solvent refined 100N, i.e., Cit-Con 100N, and hydrotreated 100Ns, i.e., RLOP 100N, etc. Diluents may be advantageous in maintenance of the reaction temperatures and removal of the water of reaction therefrom, typically diluents are comprise from about 10 to 75 weight percent of the reaction mixture and more preferably from about 20 to 40 weight percent of the reaction mixture. Additionally, pressure is not a critical factor and can be atmospheric or below up to 1000 psi or higher. Atmospheric pressure is preferred for convenience, and the pressure should be sufficient to maintain the reactants in the liquid phase.

As opposed to above, the reaction can proceed in two distinct steps. In the first step, an oil soluble alkylphenol is reacted with an alkaline earth metal base and an alpha amino acid at a reaction temperature of from about 150° C. to 225° C., preferably in the range of 170° C. to 200° C. As with the single step process above, reaction temperatures below 150° C. are undesirable as the rate of reaction is unduly slow and unwanted products may be formed while temperatures above about 250° C. can result in the degradation of the materials. The reaction is preferably conducted in the presence of a promoter, described herein above. Particularly preferred promoters are a mixture of a $C_2$ to $C_4$ carboxylic acid and a $C_2$-$C_4$ alkylene glycol and more preferably ethylene glycol. Also in place of the carboxylic acid, salts of the $C_2$ to $C_4$ carboxylic acid or mixtures of the acids and salts could also be used. Where salts or mixtures of salts and acids are used, the salt is preferably an alkaline earth metal salt and most preferably a calcium salt. However, in general, the carboxylic acid is preferred. By using acetic acid or propionic acid, higher reaction temperatures may be advantageously employed and excellent results can be obtained using acetic acid at higher temperatures, for example, at temperatures in the range of about from 180° C. to 250° C. and especially at temperatures of about from 180° C. to about 195° C. Mixtures of carboxylic acids also can be used.

Based on one mole of alkylphenol; typically, about 0.25 to 0.75, preferably from 0.3 to 0.65, even more preferably 0.4 to 0.5 moles of an alpha amino acid; about 0.025 to 0.25, preferably 0.05 to 0.15 and even more preferably from 0.075 to 0.125 moles of $C_2$ to $C_4$ carboxylic acid; about 0.75 to about 2.0, preferably from 1.0 to 1.75 moles of a $C_1$ to $C_4$ alkylene glycol are used. Typically, about 0.5 to 1.5 moles, preferably 0.65 to 1.0 mole, and even more preferably 0.75 to 0.85 mole of alkaline earth metal base are employed per mole of alkylphenol. In any event, the amount of alkaline earth metal base sufficient to neutralize the alpha amino acid and the amount of $C_2$ to $C_4$ carboxylic acid used. Particularly preferred is a calcium base.

The reaction is also typically and preferably conducted in a compatible liquid diluent, preferably a low viscosity mineral or synthetic oil. The reaction is preferably conducted for a sufficient length of time to ensure complete reaction. It is preferred to remove water generated by the neutralization of the alkylphenol. This is conventional and generally is accomplished by continuous distillation during the neutralization. Conveniently, a high molecular weight alkanol having 8 to 16 carbon atoms may be added to the first step and/or second step (described herein below) as a solvent and also to assist in the removal of water by forming a water-azeotrope which may then be distilled off.

The intermediate reaction product of the first step is cooled and the aldehyde component (defined herein above) is added to oligomerize salified alkylphenol and alpha amino acid product. Particularly preferred is a calcified intermediate reaction product. Preferably, the aldehyde component is paraformaldehyde with a charge of 0.55-1.5:1, preferably from 0.65-1.1, and even more preferred from 0.7-1.0 of paraformaldehyde to alkylphenol. The cooling of the reactor may be facilitated by addition of the high molecular weight alkanol. The reactor is then heated to the reaction temperature which is substantially the same range as specified in the first step for sufficient time to substantially complete the reaction. Distillation typically follows to remove a portion of the promoter and/or alkanol and/or water of reaction. Filtration may follow to remove a portion of any crude sediment formed during the one step or two step processes. In another aspect of the two stage reaction, the first step of the reaction could be performed and the intermediate product can be substantially separated from the unreacted materials. Commonly, these compounds are referred to as alkaline earth metal phenate and are commercially available.

If a higher TBN product is desired, the oligomeric alkylphenolic product (produced in either the single step reaction or the two step reaction) can be overbased by carbonation. Preferably, overbasing is preformed prior to distillation and filtration since the overbasing process benefits from the inclusion of the promoter and alkanol used to prepare the oligomeric alkylphenolic product. Additional calcium base can be added at this time and/or excess calcium base can be used in the neutralization step. Preferably, an alkenyl succinimide or a neutral or overbased Group II metal hydrocarbylsulfonate is present in the overbasing reaction mixture. Overbasing is typically conducted at temperatures in the range of above from 160° C. to 190° C., preferably 170° C. to 180° C. for about from 0.1 to 4 hours, depending on whether a moderate or high TBN product is desired. Conveniently, the reaction is conducted by the simple expedient of bubbling gaseous carbon dioxide through the reaction mixture. Excess diluent and any water formed during the overbasing reaction can be conveniently removed by distillation either during or after the reaction.

Carbon dioxide is employed in the reaction system in conjunction with the calcium base to form overbased products and is typically employed at a ratio of about from 1 to 3 moles per mole of alkylphenol, and preferably from about 2 to about 3 moles per mole of alkylphenol. Preferably, the amount of $CO_2$ incorporated into the calcium overbased oligomeric alkylphenolic product provides for a $CO_2$ to calcium weight ratio of about from 0.65:1 to about 0.73:1. High TBN products are typically prepared by using a mole ratio of calcium base to alkylphenol of about 1.5 to 2; a carbon dioxide mole ratio of about 0.2 to 2 preferably 0.4 to 1 moles of carbon dioxide per mole of alkylphenol and about 0.2 to 2, preferably 0.4 to 1.2 moles of alkylene glycol. As noted above, all of the excess calcium base and alkylene glycol needed to produce a high TBN product can be added in during the formation of the oligomeric alkylphenolic product or in this overbasing step or divided in any proportion between the two processes. Typically, where very high TBN products are desired, a portion of the calcium base will be added in the overbasing step. The neutralization reaction mixture or overbasing reaction mixture preferably also contains about from 1 to 20, preferably 5 to 15 weight percent of a neutral or overbased sulfonate and/or an alkenyl succinimide based on the weight of alkylphenol.

Typically, the process is conducted under vacuum up to a slight pressure, i.e., pressures ranging from about 25 mm Hg absolute to 850 mm Hg absolute and preferably is conducted under vacuum to reduce foaming up to atmospheric pressure, e.g., about from 40 mm Hg absolute to 760 mm Hg absolute.

Suitable Group II metal neutral or overbased hydrocarbyl sulfonates include natural or synthetic hydrocarbyl sulfonates such as petroleum sulfonate, synthetically alkylated aromatic sulfonates, or aliphatic sulfonates such as those derived from polyisobutylene. These sulfonates are well-known in the art. (Unlike phenates "normal" sulfonates are neutral and hence are referred to as neutral sulfonates.) The hydrocarbyl group must have a sufficient number of carbon atoms to render the sulfonate molecule oil soluble. Preferably, the hydrocarbyl portion has at least 20 carbon atoms and may be aromatic or aliphatic, but is usually alkylaromatic. Most preferred for use are calcium, magnesium or barium sulfonates which are aromatic in character. Such sulfonates are conventionally used to facilitate the overbasing by keeping the calcium base in solutions.

Sulfonates suitable for use in the present process are typically prepared by sulfonating alkyl benzene. The sulfonates can optionally be overbased to yield products having Total Base Numbers up to about 400 or more by addition of an excess of a Group II metal hydroxide or oxide and optionally carbon dioxide. Calcium hydroxide or oxide is the most commonly used material to produce the basic overbased sulfonates.

When employed, the Group II metal neutral or overbased hydrocarbyl sulfonate is employed at from about 1 to 20 wt % relative to the alkylphenol, preferably from about 1 to 10 wt %. Where the product is intended as an additive for marine crankcase lubricated oil formulations, the use of Group II metal neutral or overbased hydrocarbyl sulfonate described above are especially attractive because sulfonates are advantageously employed in such formulations in conjunction with the calcium overbased sulfurized alkylphenates.

Alternatively, in lieu of a Group II metal neutral or overbased hydrocarbyl or in combination therewith, an alkenyl succinimide may be employed. Alkenyl succinimides are well-known in the art. The alkenyl succinimides are the reaction product of a polyolefin polymer-substituted succinic anhydride with an amine, preferably a polyalkylene polyamine. The polyolefin polymer-substituted succinic anhydrides are obtained by reaction of a polyolefin polymer or a derivative thereof with maleic anhydride. The succinic anhydride thus obtained is reacted with the amine compound. The preparation of the alkenyl succinimides has been described many times in the art. See, for example, U.S. Pat. Nos. 3,390,082; 3,219,666; and 3,172,892, the disclosure of which are incorporated herein by reference. Alkyl succinimides are intended to be included within the scope of the term "alkenyl succinimide". The alkenyl group of the alkenyl succinic anhydride is derived from an alkene, preferably polyisobutene, and is obtained by polymerizing an alkene (e.g., isobutene) to provide for a polyalkene which can vary widely in its compositions. The average number of carbon atoms in the polyalkene and hence the alkenyl substituent of the succinic anhydride can range from 30 or less to 250 or more, with a resulting number average molecular weight of about 400 or less to 3,000 or more. Preferably, the average number of carbon atoms per polyalkene molecule will range from about 50 to about 100 with the polyalkenes having a number average molecular weight of about 600 to about 1,500. More preferably, the average number of carbon atoms in the polyalkene molecule ranges from about 60 to about 90 and the number average molecular weight ranges from about 800 to 1,300. Further information regarding the preparation of alkenyl succinimides and the succinic anhydride precursors can be had, for example, by reference to U.S. Pat. No. 4,744,921 and the references cited therein.

In the general preparation of overbased calcium oligomeric alkylphenolic product, demulsifiers are frequently added to enhance the hydrolytic stability of the overbased product and may be similarly employed in the present process if desired. Suitable demulsifiers which can be used include, for example, nonionic detergents such as, for example, sold under the Trademark Triton X-45 and Triton X-100 by Rohm and Haas (Philadelphia, Pa.) and ethoxylated p-octylphenols. Where used, demulsifiers are generally added at from 0.1 to 1 wt % to the alkylphenol, preferably at from 0.1 to 0.5 wt %.

Either the resulting oligomeric alkylphenolic composition or overbased oligomeric alkylphenolic composition may advantageously be filtered. The purpose of filtration is remove sediments, particularly the crystalline calcium carbonates and other insoluble materials formed during the preceding steps. Additionally, other separation steps such as distillation may be undertaken in addition to filtration to remove the water of reaction, remove unreacted reactants and/or to further isolate particularly desirable oligomeric alkylphenolic compounds of the present invention.

Lubricating Oil Compositions

The oil-soluble, oligomeric alkylphenolic product and calcium overbased oligomeric alkylphenolic product compositions produced by the process of this invention are useful lubricating oil additives imparting deposit inhibition detergency properties to the lubricating oil as well as providing an alkalinity reserve and a portion of ashless base without imparting sulfur to the lubricating oil composition. When employed in this manner, the amount of the oil-soluble, oligomeric alkylphenolic product composition ranges from about 0.5 to 40 wt % of the total lubricant composition although preferably from about 1 to 25 wt % of the total lubricant composition. Such lubricating oil compositions are useful in diesel engines, gasoline engines as well as in marine engines.

Such lubricating oil compositions employ a finished lubricating oil which may be single or multigrade. Multigrade lubricating oils are prepared by adding viscosity index (VI) improvers. Typical viscosity index improvers are polyalkyl methacrylates, ethylene, propylene copolymers, styrene-diene copolymers, and the like. So-called dispersant VI improvers which exhibit dispersant properties as well as VI modifying properties can also be used in such formulations.

The lubricating oil, or base oil, used in such compositions may be mineral oil or synthetic oils of viscosity suitable for use in the crankcase of an internal combustion engine such as gasoline engines and diesel engines which include marine engines. Crankcase lubricating oils ordinarily have a viscosity of about 1300 cSt at 0° F. to 24 cSt at 210° F. (99° C.). The lubricating oils may be derived from synthetic or natural sources. Mineral oil for use as the base oil in this invention includes paraffinic, naphthenic and other oils that are ordinarily used in lubricating oil compositions. Synthetic oils include, for example, both hydrocarbon synthetic oils and synthetic esters and mixtures thereof having the desired viscosity. Hydrocarbon synthetic oils may include, for example, oils prepared from the polymerization of ethylene or higher alpha olefin (polyalphaolefin or PAO), or from hydrocarbon synthesis procedures using carbon monoxide and hydrogen gases such as in a Fisher-Tropsch process. Useful synthetic hydrocarbon oils include liquid polymers of alpha olefins having the proper viscosity. Especially useful are the hydrogenated liquid oligomers of $C_6$ to $C_{12}$ alpha olefins such as 1-decene trimer. Likewise, alkyl benzenes of proper viscosity, such as didodecyl benzene, can be used. Useful synthetic esters include the esters of monocarboxylic acids and polycarboxylic acids, as well as mono hydroxy alkanols and polyols. Typical examples are didodecyl adipate, pentaerythritol tetracaproate, di-2-ethylhexyl adipate, dilaurylsebacate, and the like. Complex esters prepared from mixtures of mono and dicarboxylic acids and mono and dihydroxy alkanols can also be used. Blends of mineral oils with synthetic oils are also useful. For example, blends of about 10 wt % to 25 wt % hydrogenated 1-decene trimer with about 75 wt % to 90 wt % 150 SUS (100° F.) mineral oil make excellent lubricating oil bases.

The present invention also relates to a lubricating oil composition containing the additive composition of the present invention. Such a lubricating oil composition will comprise a major amount of a base oil of lubricating viscosity and a minor amount of an additive composition comprising an oligomeric alkylphenolic product and/or calcium overbased oligomeric alkylphenolic product of the present invention. Commonly, said lubricating oil composition with contain a dispersant and a wear inhibitor with optional antioxidants, viscosity index improvers as well as other components further defined in sections A-K below.

In one embodiment, the lubricating oil composition of the present invention is directed for use as a low emission diesel lubricant or LEDL having low levels of ash, sulfur and phosphorus. LEDL lubricating oil formulations are particularly desirable for use in low emission diesel engines equipped with exhaust gas after-treatment systems that can be sensitive to lubricant constituents. The LEDL lubricating oil composition of the present invention will have from about 0 wt % to 1.2 wt % ash, from about 0.1 wt % to 0.5 wt % sulfur, and from about 0.002 wt % to 0.1 wt % phosphorus. Among other things, the LEDL lubricating oil composition of the present invention provides improved oxidation and deposit control, good detergency and corrosion properties while at the same time providing compatibility with exhaust gas after-treatment systems.

The LEDL lubricating oil composition of the present invention may have, for example, the following components:
a) a major amount of a base oil of lubricating viscosity;
b) from about 0.5 wt % to 5 wt % of the oligomeric alkylphenolic product of the present invention;
c) from about 1 wt % to 12 wt % of at least one dispersant;
d) from about 0.5 wt % to 1.1 wt % of at least one zinc dithiophosphate;
e) from about 0 wt % to 2.5 wt % of at least one oxidation inhibitor;
f) from about 0 wt % to 1 wt % of at least one foam inhibitor;
g) from about 0 wt % to 10 wt % of at least one viscosity index improver; and
h) from about 0 wt % to 0.5 wt % of a corrosion inhibitor,
wherein said composition contains: a total ash content from about 0.1 wt % to 1.2 wt % ash as determined by ASTM D874, from about 0.05 wt % to 0.5 wt % sulfur, and from about 0.02 wt % to 0.1 wt % phosphorus.

The above formulation may also be suitable for use in natural gas fueled engine lubricating oil compositions as well as automotive with the caveat that automotive formulations typically contain less than 0.8 wt percent of the at least one zinc dithiophosphate and do not have the ash, sulfur or phosphorous limitations as above. The lubricating oil compositions are produced by blending a mixture of the above components and the finished product produced by that method might have a slightly different composition than the initial mixture, because the components may interact. The components can be blended in any order and can be blended as combinations of components.

Other Additive Components

The following additive components are examples of components that can be favorably employed in combination with the lubricating additive of the present invention. These examples of additives are provided to illustrate the present invention, but they are not intended to limit it.

(A) Ashless Dispersants: alkenyl succinimides, alkenyl succinimides modified with other organic compounds, and alkenyl succinimides modified with boric acid, alkenyl succinic ester.

(B) Oxidation Inhibitors:

1) Phenol type phenolic) oxidation inhibitors: 4,4'-methylenebis (2,6-di-tert-butylphenol), 4,4'-bis(2,6-di-tert-butylphenol), 4,4'-bis(2-methyl-6-tert-butylphenol), 2,2'-(methylenebis(4-methyl-6-tert-butyl-phenol), 4,4'-butylidenebis (3-methyl-6-tert-butylphenol), 4,4'-isopropylidenebis(2,6-di-tert-butylphenol), 2,2'-methylenebis(4-methyl-6-nonylphenol), 2,2'-isobutylidene-bis(4,6-dimethylphenol), 2,2'-methylenebis(4-methyl-6-cyclohexylphenol), 2,6-di-tert-butyl-4-methylphenol, 2,6-di-tert-butyl-4-ethylphenol, 2,4-dimethyl-6-tert-butyl-phenol, 2,6-di-tert-α-dimethylamino-p-cresol, 2,6-di-tert-4(N.N' dimethylaminomethylphenol), 4,4'-thiobis(2-methyl-6-tert-butylphenol), 2,2'-thiobis(4-methyl-6-tert-butylphenol), bis(3-methyl-4-hydroxy-5-tert-butylbenzyl)-sulfide, and bis (3,5-di-tert-butyl-4-hydroxybenzyl).

2) Diphenylamine type oxidation inhibitor: alkylated diphenylamine, phenyl-α-naphthylamine, and alkylated α-naphthylamine.

3) Other types: metal dithiocarbamate (e.g., zinc dithiocarbamate), and methylenebis (dibutyldithiocarbamate).

(C) Rust Inhibitors (Anti-rust agents):

1) Nonionic polyoxyethylene surface active agents: polyoxyethylene lauryl ether, polyoxyethylene higher alcohol ether, polyoxyethylene nonylphenyl ether, polyoxyethylene octylphenyl ether, polyoxyethylene octyl stearyl ether, polyoxyethylene oleyl ether, polyoxyethylene sorbitol monostearate, polyoxyethylene sorbitol mono-oleate, and polyethylene glycol monooleate.

2) Other compounds: stearic acid and other fatty acids, dicarboxylic acids, metal soaps, fatty acid amine salts, metal salts of heavy sulfonic acid, partial carboxylic acid ester of polyhydric alcohol, and phosphoric ester.

(D) Demulsifiers: addition product of alkylphenol and ethyleneoxide, polyoxyethylene alkyl ether, and polyoxyethylene sorbitane ester.

(E) Extreme Pressure Agents (EP agents): zinc dialkyldithiophosphate (Zn-DTP, primary alkyl type & secondary alkyl type), sulfurized oils, diphenyl sulfide, methyl trichlorostearate, chlorinated naphthalene, benzyl iodide, fluoroalkylpolysiloxane, and lead naphthenate.

(F) Friction Modifiers: fatty alcohol, fatty acid, amine, borated ester, and other esters.

(G) Multifunctional Additives: sulfurized oxymolybdenum dithiocarbamate, sulfurized oxymolybdenum organo phosphoro dithionate, oxymolybdenum monoglyceride, oxymolybdenum diethylate amide, amine-molybdenum complex compound, and sulfur-containing molybdenum complex compound.

(H) Viscosity Index Improvers: polymethacrylate type polymers, ethylene-propylene copolymers, styrene-isoprene copolymers, hydrated styrene-isoprene copolymers, polyisobutylene, and dispersant type viscosity index improvers.

(I) Pour-point Depressants: polymethyl methacrylate.

(J) Foam Inhibitors: alkyl methacrylate polymers and dimethyl silicone polymers.

(K) Metal Detergents: sulfurized or unsulfurized alkyl or alkenyl phenates, alkyl or alkenyl aromatic sulfonates, calcium sulfonates, sulfurized or unsulfurized metal salts of multi-hydroxy alkyl or alkenyl aromatic compounds, alkyl or alkenyl hydroxy aromatic sulfonates, sulfurized or unsulfurized alkyl or alkenyl naphthenates, metal salts of alkanoic acids, metal salts of an alkyl or alkenyl multiacid, and chemical and physical mixtures thereof.

Other additives which may be present in the formulation include rust inhibitors, foam inhibitors, corrosion inhibitors, metal deactivators, pour point depressants, antioxidants, and a variety of other well-known additives.

EXAMPLES

The invention will be further illustrated by the following examples, which set forth particularly advantageous method embodiments. While the Examples are provided to illustrate the present invention, they are not intended to limit it. This application is intended to cover those various changes and substitutions that may be made by those skilled in the art without departing from the spirit and scope of the appended claims. A further understanding of the invention can be had from the following non-limiting examples.

Example 1

One Step Reaction Process

A four liter glass reaction vessel was sparged with nitrogen and charged with 198 grams (0.47 moles) of a linear C20-28 alkylphenol, 198 grams (0.76 moles) of a branched C12 alkylphenol, 43 grams (0.57 moles) glycine, 6 grams (0.1 moles) acetic acid, 72 grams (0.98 moles) calcium hydroxide, 400 grams of a 100N group II diluent oil, 145 grams of 2-ethylhexanol, 125 grams of ethylene glycol, 38.5 grams (1.23 moles) of paraformaldehyde and 1 drops of foam inhibitor. The reactor was agitated at 800 rpm, and maintained at 14.21 psia under nitrogen. The temperature was ramped to 220° C. in 5 hrs; water removal began just above 100° C.

Distillation commenced as soon as 220° C. was reached. Initially, vacuum had to be applied very gradually to avoid excessive foaming, and the temperature was allowed to fall to 180° C. Once we were able to hold the reactor at 220° C. and about 1 psia, we held for 0.5 hr, then broke vacuum with nitrogen. The product was cooled to 120° C. and pumped out of the reactor. A small sample was retained for measuring crude sediment, and the rest was filtered over Celite.

Samples were sent for analysis; a small portion was decalcified for Electro Spray Ionization, see Table 3. The product was further characterized as having: Crude Sediment=2.0%; % Ca=3.64 wt %; % N=0.719 wt %; Viscosity @100° C.=93 cSt, TBN=124; Sulfated Ash/TBN=0.10.

Example 2

Two Step Reaction Process

A four liter glass reaction vessel was sparged with nitrogen and charged with 395 grams (0.94 moles) of a linear C20-28 alkylphenol, 395 grams (1.51 moles) of a branched C12 alkylphenol, 86 grams (1.14 moles) glycine, 12 grams (0.2 moles) acetic acid, 144 grams (1.95 moles) calcium hydroxide, 800 grams of a 100N group II diluent oil, 120 grams of 2-ethylhexanol, 250 grams of ethylene glycol and 2 drops of foam inhibitor. The reactor was agitated at 800 rpm, and maintained at 14.21 psia under nitrogen. The temperature was ramped to 190° C. in 2.25 hrs; water removal began just above 100° C. The assembly was held at 190° C. for 1 hr.

After one hour, the heater was lowered, and 170 mls of room temperature 2-ethylhexanol was pumped into the reactor via peristaltic pump. The mixture was cooled to 70° C. so that it could be safely opened and 77 grams (2.45 moles) of paraformaldehyde added. The stopper was replaced, and the reactor was ramped to 220° in 2.5 hrs; note that the ramp had to be held at 187° for about half an hour to prevent excessive foaming.

Upon reaching 225° C., distillation was commenced. Initially, vacuum had to be applied very gradually to avoid excessive foaming, and the temperature was allowed to fall to 180° C. Once we were able to hold the reactor at 220° C. and about 1 psia, we held for 0.5 hr, then broke vacuum with nitrogen. The product was cooled to 120° C. and pumped out of the reactor. A small sample was retained for measuring crude sediment, and the rest was filtered over Celite.

Samples were sent for analysis; a small portion was decalcified for Electro Spray Ionization see Table 3. The product was further characterized as having: Crude Sediment=1.6%; % Ca=4.0 wt %;% N=0.739 wt %; TBN=132; Viscosity @100° C.=706 cSt; Sulfated Ash/TBN=0.099.

Example 3

A four liter glass reaction vessel was sparged with nitrogen and charged with 395 grams (0.94 moles) of a linear C20-28 alkylphenol, 395 grams (1.51 moles) of a branched C12 alkylphenol, 114 grams (1.52 moles) glycine, 12 grams (0.2 moles) acetic acid, 144 grams (1.95 moles) calcium hydroxide, 800 grams of a 100N group II diluent oil, 120 grams of 2-ethylhexanol, 250 grams of ethylene glycol and 2 drops of foam inhibitor. The reactor was agitated at 800 rpm, and maintained at 14.21 psia under nitrogen. The temperature was ramped to 190° C. in 2.25 hrs; water removal began just above 100° C. The assembly was held at 190° C. for 1 hr.

After one hour, the heater was lowered, and 170 mls of room temperature 2-ethylhexanol was pumped into the reactor via peristaltic pump. The mixture was cooled to 70° C. so that it could be safely opened and 98 grams (3.10 moles) of paraformaldehyde added. The stopper was replaced, and the reactor was ramped to 220° in 2.5 hrs; note that the ramp had to be held at 187° for about half an hour to prevent excessive foaming.

Upon reaching 225° C., distillation was commenced. Initially, vacuum had to be applied very gradually to avoid excessive foaming, and the temperature was allowed to fall to 180° C. Once we were able to hold the reactor at 220° C. and about 1 psia, we held for 0.5 hr, then broke vacuum with nitrogen. The product was cooled to 120° C. and pumped out of the reactor. A small sample was retained for measuring crude sediment, and the rest was filtered over Celite.

Samples were sent for analysis; a small portion was decalcified for Electro Spray Ionization see Table 3. The product was further characterized as having: Crude Sediment=4.0%; Ca=3.34 wt %;% N=0.808 wt %; Viscosity @100° C.=511 cSt; TBN=119; Sulfated Ash/TBN=0.095.

Example 4

A four liter glass reaction vessel was sparged with nitrogen and charged with 395 grams (0.94 moles) of a linear C20-28 alkylphenol, 395 grams (1.51 moles) of a branched C12 alkylphenol, 71 grams (0.95 moles) glycine, 12 grams (0.2 moles) acetic acid, 144 grams (1.95 moles) calcium hydroxide, 1100 grams of a 100N group I diluent oil, 120 grams of 2-ethylhexanol, 250 grams of ethylene glycol and 2 drops of foam inhibitor. The reactor was agitated at 800 rpm, and maintained at 14.21 psia under nitrogen. The temperature was ramped to 190° C. in 2.25 hrs; water removal began just above 100° C. The mixture was held at 190° C. for 1 hr.

After one hour, the heater was lowered, and 170 mls of room temperature 2-ethylhexanol was pumped into the reactor via peristaltic pump. The mixture was cooled to 70° C. so that it could be safely opened and 54 grams (1.72 moles) of paraformaldehyde added. The stopper was replaced, and the reactor was ramped to 220° in 2.5 hrs; note that the ramp had to be held at 187° for about half an hour to prevent excessive foaming.

Upon reaching 225° C., distillation was commenced. Initially, vacuum had to be applied very gradually to avoid excessive foaming, and the temperature was allowed to fall to 180° C. Once we were able to hold the reactor at 220° C. and about 1 psia, we held for 0.5 hr, then broke vacuum with nitrogen. The product was cooled to 120° C. and pumped out of the reactor. A small sample was retained for measuring crude sediment, and the rest was filtered over Celite.

Samples were sent for analysis; a small portion was decalcified for Electro Spray Ionization, see Table 3. The product was characterized as having: Crude Sediment=0.6%; % Ca=2.99 wt %; % N=0.49 wt %; Viscosity @100° C.=51 cSt; TBN=118.

Example 5

A four liter glass reaction vessel was sparged with nitrogen and charged with 395 grams (0.94 moles) of a linear C20-28 alkylphenol, 395 grams (1.51 moles) of a branched C12 alkylphenol, 57 grams (0.76 moles) glycine, 12 grams (0.2 moles) acetic acid, 144 grams (1.95 moles) calcium hydroxide, 1000 grams of a 100N group I diluent oil, 120 grams of 2-ethylhexanol, 250 grams of ethylene glycol and 2 drops of foam inhibitor. The reactor was agitated at 800 rpm, and maintained at 14.21 psia under nitrogen. The temperature was ramped to 190° C. in 2.25 hrs; water removal began just above 100° C. The assembly was held at 190° C. for 1 hr.

After one hour, the heater was lowered, and 170 mls of room temperature 2-ethylhexanol was pumped into the reactor via peristaltic pump. The mixture was cooled to 70° C. so that it could be safely opened and 43.6 grams (1.38 moles) of paraformaldehyde added. The stopper was replaced, and the reactor was ramped to 220° in 2.5 hrs; note that the ramp had to be held at 187° for about half an hour to prevent excessive foaming.

Upon reaching 225° C., distillation was commenced. Initially, vacuum had to be applied very gradually to avoid excessive foaming, and the temperature was allowed to fall to 180° C. Once we were able to hold the reactor at 220° C. and about 1 psia, we held for 0.5 hr, then broke vacuum with nitrogen. The product was cooled to 120° C. and pumped out of the reactor. A small sample was retained for measuring crude sediment, and the rest was filtered over Celite.

Due to the high crude sediment, the only analysis obtained was Electro Spray Ionization, see Table 3. Crude Sediment=6.0%.

Example 6

A four liter glass reaction vessel was sparged with nitrogen and charged with 395 grams (0.94 moles) of a linear C20-28 alkylphenol, 395 grams (1.51 moles) of a branched C12 alkylphenol, 71 grams (0.95 moles) glycine, 12 grams (0.2 moles) acetic acid, 144 grams (1.95 moles) calcium hydroxide, 1000 grams of a 100N group I diluent oil, 120 grams of 2-ethylhexanol, 250 grams of ethylene glycol and 2 drops of foam inhibitor. The reactor was agitated at 800 rpm, and maintained at 14.21 psia under nitrogen. The temperature was ramped to 190° C. in 2.25 hrs; water removal began just above 100° C. The assembly was held at 190° C. for 1 hr.

After one hour, the heater was lowered, and 170 mls of room temperature 2-ethylhexanol was pumped into the reactor via peristaltic pump. The mixture was cooled to 70° C. so that it could be safely opened and 77 grams (2.45 moles) of paraformaldehyde added. The stopper was replaced, and the reactor was ramped to 220° in 2.5 hrs; note that the ramp had to be held at 187° for about half an hour to prevent excessive foaming.

Upon reaching 225° C., distillation was commenced. Initially, vacuum had to be applied very gradually to avoid excessive foaming, and the temperature was allowed to fall to 180° C. Once we were able to hold the reactor at 220° C. and about 1 psia, we held for 0.5 hr, then broke vacuum with nitrogen. The product was cooled to 120° C. and pumped out of the reactor. A small sample was retained for measuring crude sediment, and the rest was filtered over Celite.

Samples were sent for analysis; a small portion was decalcified for Electro Spray Ionization, see Table 3. The product was further characterized as having: Crude Sediment=0.6%; % Ca=3.69 wt %; % N=0.57 wt %; Viscosity @100° C.=82 cSt; TBN=120; Sulfated Ash/TBN=0.10.

Example 7

A four liter glass reaction vessel was sparged with nitrogen and charged with 395 grams (0.94 moles) of a linear C20-28 alkylphenol, 395 grams (1.51 moles) of a branched C12 alkylphenol, 100 grams (1.33 moles) glycine, 12 grams (0.2 moles) acetic acid, 144 grams (1.95 moles) calcium hydroxide, 1000 grams of a 100N group II diluent oil, 120 grams of 2-ethylhexanol, 250 grams of ethylene glycol and 2 drops of foam inhibitor. The reactor was agitated at 800 rpm, and maintained at 14.21 psia under nitrogen. The temperature was ramped to 190° C. in 2.25 hrs; water removal began just above 100° C. The assembly was held at 190° C. for 1 hr.

After one hour, the heater was lowered, and 170 mls of room temperature 2-ethylhexanol was pumped into the reactor via peristaltic pump. The mixture was cooled to 70° C. so that it could be safely opened and 87 grams (2.75 moles) of paraformaldehyde added. The stopper was replaced, and the reactor was ramped to 220° in 2.5 hrs; note that the ramp had to be held at 187° for about half an hour to prevent excessive foaming.

Upon reaching 225° C., distillation was commenced. Initially, vacuum had to be applied very gradually to avoid excessive foaming, and the temperature was allowed to fall to 180° C. Once we were able to hold the reactor at 220° C. and about 1 psia, we held for 0.5 hr, then broke vacuum with nitrogen. The product was cooled to 120° C. and pumped out of the reactor. A small sample was retained for measuring crude sediment, and the rest was filtered over Celite.

Samples were sent for analysis; a small portion was decalcified for Electro Spray Ionization, see Table 3. The product was further characterized as having: Crude Sediment=3.2%; % Ca=3.15 wt %; % N=0.683 wt %; Viscosity @100° C.=98 cSt; TBN=109; Sulfated Ash/TBN=0.096.

Examples 8-16

The process of Examples 2-7 was substantially repeated with the changes noted in the charge mole ratio of glycine and paraformaldehyde employed. Details are outlined in Table 2 below.

ethylene glycol and 2 drops of foam inhibitor. The reactor was agitated at 800 rpm, and maintained at 14.21 psia under nitrogen. The temperature was ramped to 190° C. in 2.25 hrs; water removal began just above 100° C. The assembly was held at 190° C. for 1 hr.

After one hour, the heater was lowered, and 170 mls of room temperature 2-ethylhexanol was pumped into the reactor via peristaltic pump. The mixture was cooled to 70° C. so that it could be safely opened and 77 grams (2.45 moles) of paraformaldehyde added. The stopper was replaced, and the reactor was ramped to 220° in 2.5 hrs; note that the ramp had to be held at 187° for about half an hour to prevent excessive foaming.

Upon reaching 225° C., distillation was commenced. Initially, vacuum had to be applied very gradually to avoid excessive foaming, and the temperature was allowed to fall to 180° C. Once we were able to hold the reactor at 220° C. and about 1 psia, we held for 0.5 hr, then broke vacuum with nitrogen. The product was cooled to 120° C. and pumped out of the reactor. A small sample was retained for measuring crude sediment, and the rest was filtered over Celite.

Samples were sent for analysis; a small portion was decalcified for Electro Spray Ionization, see Table 3. The product was further characterized as having: Crude Sediment=3.2%; % Ca=3.64 wt %; % N=1.08 wt %; TBN=125; Viscosity @100° C.=163 cSt.

Example 18

A four liter glass reaction vessel was sparged with nitrogen and charged with 395 grams (0.94 moles) of a linear C20-28 alkylphenol, 395 grams (1.51 moles) of a branched C12 alkylphenol, 71 grams (0.95 moles) glycine, 12 grams (0.2 moles) acetic acid, 144 grams (1.95 moles) calcium hydroxide, 1100 grams of a 100N group I diluent oil, 120 grams of 2-ethylhexanol, 170 grams of ethylene glycol and 2 drops of foam

TABLE 2

| Example | Glycine | PF[1] | Crude sediment wt % | TBN D2896 | Ca wt % | Nitrogen wt % | Viscosity @ 100° C. | Sulfate ash wt %[2] |
|---|---|---|---|---|---|---|---|---|
| 8 | 0.23 | 1.00 | 1.2 | 126 | 3.91 | 0.415 | 55 | 13.58 |
| 9 | 0.31 | 0.84 | 0.6 | 120 | 3.75 | 0.472 | 87 | 12.22 |
| 10 | 0.31 | 1.00 | 1.6 | 128 | 3.90 | 0.518 | 68 | — |
| 11 | 0.39 | 0.70 | 0.6 | 123 | 3.72 | 0.584 | 1104 | 12.43 |
| 12 | 0.39 | 0.70 | 1.2 | 124 | 3.7 | 0.616 | 533 | — |
| 13 | 0.39 | 1.40 | 2.8 | 98 | 2.93 | 0.532 | 39 | 9.86 |
| 14 | 0.46 | 0.70 | 0.6 | 97 | 2.82 | 0.535 | 473 | — |
| 15 | 0.54 | 1.12 | 3.6 | 104 | 2.87 | 0.651 | 109 | 9.92 |
| 16 | 0.62 | 1.26 | 4.0 | 119 | 3.34 | 0.808 | 511 | 11.27 |

[1]PF is paraformaldehyde
[2]Sulfate ash according to ASTM D874

Example 17

Alanine

The effect of substituting the amino acid was from glycine to aniline was studied. A four liter glass reaction vessel was sparged with nitrogen and charged with 395 grams (0.94 moles) of a linear C20-28 alkylphenol, 395 grams (1.51 moles) of a branched C12 alkylphenol, 101.5 grams (1.14 moles) alanine, 12 grams (0.2 moles) acetic acid, 144 grams (1.95 moles) calcium hydroxide, 800 grams of a 100N group II diluent oil, 120 grams of 2-ethylhexanol, 250 grams of inhibitor. The reactor was agitated at 800 rpm, and maintained at 14.21 psia under nitrogen. The temperature was ramped to 190° C. in 2.25 hrs; water removal began just above 100° C. The mixture was held at 190° C. for 1 hr.

After one hour, the heater was lowered, and 170 mls of room temperature 2-ethylhexanol was pumped into the reactor via peristaltic pump. The mixture was cooled to 70° C. so that it could be safely opened and 47 grams (1.49 moles) of paraformaldehyde added. The stopper was replaced, and the reactor was ramped to 220° in 2.5 hrs; note that the ramp had to be held at 187° for about half an hour to prevent excessive foaming.

Upon reaching 225° C., distillation was commenced. Initially, vacuum had to be applied very gradually to avoid excessive foaming, and the temperature was allowed to fall to 180° C. Once we were able to hold the reactor at 220° C. and about 1 psia, we held for 0.5 hr, then broke vacuum with nitrogen. The product was cooled to 120° C. and pumped out of the reactor. A small sample was retained for measuring crude sediment, and the rest was filtered over Celite.

Samples were sent for analysis; a small portion was decalcified for Electro Spray Ionization, see Table 3. The product was characterized as having: Crude Sediment=0.7%; % Ca=3.56 wt %; % N=0.59 wt %; Viscosity @100° C.=cSt; TBN=120.

Example 19

A four liter glass reaction vessel was sparged with nitrogen and charged with 395 grams (0.94 moles) of a linear C20-28 alkylphenol, 395 grams (1.51 moles) of a branched C12 alkylphenol, 71 grams (0.95 moles) glycine, 12 grams (0.2 moles) acetic acid, 144 grams (1.95 moles) calcium hydroxide, 1100 grams of a 100N group I diluent oil, 120 grams of 2-ethylhexanol, 125 grams of ethylene glycol and 2 drops of foam inhibitor. The reactor was agitated at 800 rpm, and maintained at 14.21 psia under nitrogen. The temperature was ramped to 190° C. in 2.25 hrs; water removal began just above 100° C. The mixture was held at 190° C. for 1 hr.

After one hour, the heater was lowered, and 170 mls of room temperature 2-ethylhexanol was pumped into the reactor via peristaltic pump. The mixture was cooled to 70° C. so that it could be safely opened and 47 grams (1.49 moles) of paraformaldehyde added. The stopper was replaced, and the reactor was ramped to 220° in 2.5 hrs; note that the ramp had to be held at 187° for about half an hour to prevent excessive foaming.

Upon reaching 225° C., distillation was commenced. Initially, vacuum had to be applied very gradually to avoid excessive foaming, and the temperature was allowed to fall to 180° C. Once we were able to hold the reactor at 220° C. and about 1 psia, we held for 0.5 hr, then broke vacuum with nitrogen. The product was cooled to 120° C. and pumped out of the reactor. A small sample was retained for measuring crude sediment. Since the crude sediment was much higher than for the same reaction which used 170 grams of ethylene glycol, no other analyticals were obtained. Crude Sediment=4.4%.

Example 20

Two Step Reaction Process—Gylcine in Second Step

The effect of delaying the addition of the alpha amino acid until after calcifying the alkylphenol was studied. A four liter glass reaction vessel was sparged with nitrogen and charged with 757 grams ((2.88 moles) of a branched C12 alkylphenol, 757 grams of a 100N group I diluent oil, 107 grams (1.44 moles) calcium hydroxide, and 180 grams ethylene glycol. The reactor was agitated at 800 rpm, and maintained at 14.21 psia under nitrogen. The temperature was ramped to 200° C. in 2 hrs; water removal began just above 100° C. The mixture was held at 200° C. for 0.5 hr.

The temperature was lowered to 80° C. and 77 grams (1.00 mole) glycine, 61 grams (1.90 moles) paraformaldehyde and 350 grams of decyl alcohol were added. The mixture was ramped to 190° C. in 2.5 hr. Upon reaching 190° C., distillation was commenced. Initially, vacuum had to be applied very gradually to avoid excessive foaming. The reactor was held at 190° C. and about 1 psia for about 1 hr, and then broke vacuum with nitrogen. The product was cooled to 120° C. and pumped out of the reactor. A small sample was retained for measuring crude sediment, and the rest was filtered over Celite. The product was characterized as having: Crude Sediment=0.3%; Ca=3.34%; Vis @100° C.=99 cSt; TBN=119.

Example 21

Prophetic Catechol

A four liter glass reaction vessel is sparged with nitrogen and is charged with 168 grams (0.40 moles) of a linear C20-28 alkylphenol, 168 grams (0.65 moles) of a branched C12 alkylphenol, 20 grams (0.18 moles catechol), 43 grams (0.57 moles) glycine, 6 grams (0.1 moles) acetic acid, 72 grams (0.98 moles) calcium hydroxide, 400 grams of a 100N group II diluent oil, 145 grams of 2-ethylhexanol, 125 grams of ethylene glycol, 38.5 grams (1.23 moles) of paraformaldehyde and 1 drop of foam inhibitor. The reactor is agitated at 800 rpm, and maintained at 14.21 psia under nitrogen. The temperature is ramped to 220° C. in 5 hrs; water removal begins just above 100° C.

Distillation is commenced as soon as 220° C. is reached. Initially, vacuum needs to be applied very gradually to avoid excessive foaming. Then the reactor is held at 220° C. and about 1 psia, for about 0.5 hr, then vacuum is broken with nitrogen. The resulting product is cooled to 120° C. and pumped out of the reactor. A small sample is retained for measuring crude sediment, and the rest is filtered over Celite.

Example 22

Prophetic Resorcinol

A four liter glass reaction vessel is sparged with nitrogen and charged with 168 grams (0.40 moles) of a linear C20-28 alkylphenol, 168 grams (0.65 moles) of a branched C12 alkylphenol, 20 grams (0.18 moles resorcinol), 43 grams (0.57 moles) glycine, 6 grams (0.1 moles) acetic acid, 72 grams (0.98 moles) calcium hydroxide, 400 grams of a 100N group II diluent oil, 145 grams of 2-ethylhexanol, 125 grams of ethylene glycol, 38.5 grams (1.23 moles) of paraformaldehyde and 1 drop of foam inhibitor. The reactor is agitated at 800 rpm, and maintained at 14.21 psia under nitrogen. The temperature is ramped to 220° C. in 5 hrs; water removal begins just above 100° C.

Distillation is commenced as soon as 220° C. is reached. Initially, vacuum needs to be applied very gradually to avoid excessive foaming. Then the reactor is held at 220° C. and about 1 psia, for about 0.5 hr, then vacuum is broken with nitrogen. The resulting product is cooled to 120° C. and pumped out of the reactor. A small sample is retained for measuring crude sediment, and the rest is filtered over Celite.

COMPARATIVE EXAMPLES

Comparative Example A

No Glycine

Reaction in the absence of an alpha amino acid or amino compound—In order to demonstrate the criticality for the amino acid component in this reaction, the following reaction was performed in the absence of an alpha amino acid or amino compound. A four liter glass reaction vessel was sparged with nitrogen and charged with 946 grams (3.6 moles) of a branched C12 alkylphenol, 960 grams of a 100N group I diluent oil, 173 grams (2.3 moles) calcium hydroxide, and 173 grams of ethylene glycol. The reactor was agitated at 800 rpm, and maintained at 14.21 psia under nitrogen. The temperature was ramped to 155° C. in 1 hr, and then to 200° C. in 3 hrs; water removal began just above 100° C.

The temperature was lowered to 60° C. and 72 grams (2.4 moles) of paraformaldehyde was added. The mixture was ramped to 110° C. in 0.5 hr. The temperature was then raised to 200° C. in 1 hr.

Upon reaching 200° C., distillation was commenced. Initially, vacuum had to be applied very gradually to avoid excessive foaming. The reactor was held at 200° C. and about 1 psia for about 1 hr, and then vacuum was broken with nitrogen. The product was cooled to 120° C. and pumped out of the reactor. A small amount was sent for ESI, see Table 3. Crude sediment was not determined, Ca=4.07%.

Comparative Example A-1

No Glycine

Comparative Example A was substantially repeated however, using a mixture of alkylphenols and a single step reaction process. A four liter glass reaction vessel was sparged with nitrogen and charged with 380 grams (0.9 moles) of a linear C20-28 alkylphenol, 236 grams (0.9 moles) of a branched C12 alkylphenol, 87 grams (1.2 moles) calcium hydroxide, 480 grams of a 100N group II diluent oil, 192 grams (3.1 moles) of ethylene glycol, 50 grams (1.6 moles) of paraformaldehyde and 1 drop of foam inhibitor. The reactor was agitated at 800 rpm, and maintained at 14.21 psia under nitrogen. The temperature was ramped to 220° C. in 5 hrs. Granules were observed up to 175° C., but then disappeared. The product remained murky with less dehydration being observed than usual.

Distillation commenced as soon as 220° C. was reached. Initially, vacuum had to be applied very gradually to avoid excessive foaming, and the temperature was allowed to fall to 180° C. After pump-out, a crude sediment was obtained— 24%; very unacceptable.

Comparative Example B

N-methyl glycine

Reaction in the absence of an alpha amino acid but with Sacrosine (N-methyl glycine)—In order to demonstrate the criticality for the amino acid component in this reaction, the following reaction was performed in the absence of an alpha amino acid but with Sacrosine. A four liter glass reaction vessel was sparged with nitrogen and charged with 395 grams (0.94 moles) of a linear C20-28 alkylphenol, 395 grams (1.51 moles) of a branched C12 alkylphenol, 101.5 grams (1.14 moles) sacrosine, 12 grams (0.2 moles) acetic acid, 144 grams (1.95 moles) calcium hydroxide, 800 grams of a 100N group II diluent oil, 120 grams of 2-ethylhexanol, 250 grams of ethylene glycol and 2 drops of foam inhibitor. The reactor was agitated at 800 rpm, and maintained at 14.21 psia under nitrogen. The temperature was ramped to 190° C. in 2.25 hrs; water removal began just above 100° C. The assembly was held at 190° C. for 1 hr.

After one hour, the heater was lowered, and 170 mls of room temperature 2-ethylhexanol was pumped into the reactor via peristaltic pump. The mixture was cooled to 70° C. so that it could be safely opened and 77 grams (2.45 moles) of paraformaldehyde added. The stopper was replaced, and the reactor was ramped to 220° in 2.5 hrs; note that the ramp had to be held at 187° for about half an hour to prevent excessive foaming.

Upon reaching 225° C., distillation was commenced. Unfortunately, the product soon solidified upon removal of solvent, and had to be disposed. A small sample was scraped out and decalcified for Electro Spray Ionization, see Table 3.

Comparative Example C

N,N-dimethylglycine

Reaction in the absence of an alpha amino acid but with N,N-dimethylglycine. In order to demonstrate the criticality for the amino acid component in this reaction, the following reaction was performed in the absence of an alpha amino acid but with N,N-dimethylglycine. A four liter glass reaction vessel was sparged with nitrogen and charged with 296 grams (0.70 moles) of a linear C20-28 alkylphenol, 296 grams (1.13 moles) of a branched C12 alkylphenol, 76 grams (0.74 moles) N,N-Dimethylglycine, 9 grams (015 moles) acetic acid, 108 grams (1.46 moles) calcium hydroxide, 750 grams of a 100N group I diluent oil, 90 grams of 2-ethylhexanol, 188 grams of ethylene glycol and 2 drops of foam inhibitor. The reactor was agitated at 800 rpm, and maintained at 14.21 psia under nitrogen. The temperature was ramped to 190° C. in 2.25 hrs; water removal began just above 100° C. The mixture was held at 190° C. for 1 hr.

After one hour, the heater was lowered, and 128 mls of room temperature 2-ethylhexanol was pumped into the reactor via peristaltic pump. The mixture was cooled to 70° C. so that it could be safely opened and 40.5 grams (1.28 moles) of paraformaldehyde added. The stopper was replaced, and the reactor was ramped to 220° in 2.5 hrs; note that the ramp had to be held at 187° for about half an hour to prevent excessive foaming.

Upon reaching 225° C., distillation was commenced. Initially, vacuum had to be applied very gradually to avoid excessive foaming, and the temperature was allowed to fall to 180° C. Very soon, however, the reaction mixture thickened and the agitator seized. No analyses were carried out.

Comparative Example D

Octylamine

Reaction in the absence of an alpha amino acid but with straight chain primary amine (octylamine)—In order to demonstrate the criticality for the amino acid component in this reaction, the following reaction was performed in the absence of an alpha amino acid but with Octylamine. A four liter glass reaction vessel was sparged with nitrogen and charged with 395 grams (0.94 moles) of a linear C20-28 alkylphenol, 395 grams (1.51 moles) of a branched C12 alkylphenol, 12 grams (0.2 moles) acetic acid, 110 grams (1.48 moles) calcium hydroxide, 1000 grams of a 100N group II diluent oil, 120 grams of 2-ethylhexanol, 250 grams of ethylene glycol and 2 drops of foam inhibitor. The reactor was agitated at 800 rpm, and maintained at 14.21 psia under nitrogen. The temperature was ramped to 190° C. in 2.25 hrs; water removal began just above 100° C. The assembly was held at 190° C. for 1 hr.

After one hour, the heater was lowered, and 170 mls of room temperature 2-ethylhexanol was pumped into the reactor via peristaltic pump. The mixture was cooled to 70° C. so that it could be safely opened and 129.5 grams (1 mole) octylamine and 77.5 (2.45 moles) of paraformaldehyde added. The stopper was replaced, and the reactor was ramped to 150° C. in 2 hrs; the ramp was continued to 220° C. in 1 hr.

Upon reaching 220° C., distillation was commenced. Initially, vacuum had to be applied very gradually to avoid excessive foaming, and the temperature was allowed to fall to 180° C. Once we were able to hold the reactor at 220° C. and about 1 psia, we held for 0.5 hr, then broke vacuum with nitrogen. The product was cooled to 120° C. and pumped out of the reactor. It was unacceptably cloudy, so a crude sediment was not taken.

Comparative Example E

Anisidine

Reaction in the absence of an alpha amino acid but with anisidine (4-Methoxy-phenylamine)—In order to demonstrate the criticality for the amino acid component in this reaction, the following reaction was performed in the absence of an alpha amino acid but with anisidine. A four liter glass reaction vessel was sparged with nitrogen and charged with 946 grams (3.6 moles) of a branched C12 alkylphenol, 960 grams of a 100N group I diluent oil, 148 grams (2.2 moles) calcium hydroxide, and 384 grams of ethylene glycol. The reactor was agitated at 800 rpm, and maintained at 14.21 psia under nitrogen. The temperature was ramped to 155° C. in 1 hr, and then to 200° C. in 3 hrs; water removal began just above 100° C.

The temperature was lowered to 60° C. and 101 grams (3.2 moles) of paraformaldehyde and 123 grams (1.6 moles) anisidine were added. The mixture was ramped to 110° C. in 0.5 hr and stirred at this temperature overnight.

The temperature was then raised to 200° C. in 1 hr, and a vacuum of 4 psia applied to distill away the volatiles. The reactor was held at 200° C. and about 4 psia for about 1 hr, and then vacuum was broken with nitrogen. The product was cooled to 120° C. and pumped out of the reactor. A small amount was sent for ESI, see Table 3. Crude Sediment=1.2%, Ca=2.56%.

Comparative Example F

Pyrrole

Reaction in the absence of an alpha amino acid but with pyrrole (1H-pyrrole)—In order to demonstrate the criticality for the amino acid component in this reaction, the following reaction was performed in the absence of an alpha amino acid but with pyrrole. A four liter glass reaction vessel was sparged with nitrogen and charged with 395 grams (0.94 moles) of a linear C20-28 alkylphenol, 395 grams (1.51 moles) of a branched C12 alkylphenol, 12 grams (0.2 moles) acetic acid, 110 grams (1.48 moles) calcium hydroxide, 1000 grams of a 100N group II diluent oil, 120 grams of 2-ethylhexanol, 250 grams of ethylene glycol and 2 drops of foam inhibitor. The reactor was agitated at 800 rpm, and maintained at 14.21 psia under nitrogen. The temperature was ramped to 190° C. in 2.25 hrs; water removal began just above 100° C. The assembly was held at 190° C. for 1 hr. After one hour, the heater was lowered, and 170 mls of room temperature 2-ethylhexanol was pumped into the reactor via peristaltic pump. The mixture was cooled to 70° C. so that it could be safely opened and 16.7 (0.25 moles) pyrrole and 77.5 (2.45 moles) of paraformaldehyde added. The stopper was replaced, and the reactor was ramped to 150° C. in 2 hrs; the ramp was continued to 220° C. in 1 hr. Upon reaching 220° C., distillation was commenced. Initially, vacuum had to be applied very gradually to avoid excessive foaming, and the temperature was allowed to fall to 180° C. Once we were able to hold the reactor at 220° C. and about 1 psia, we held for 0.5 hr, then broke vacuum with nitrogen. The product was cooled to 120° C. and pumped out of the reactor. It was visibly cloudy, so a crude sediment was not taken. A sample was sent for Electro Spray Ionization-see Table 3.

Comparative Example G

No Acetic Acid

Reaction with an alpha amino acid but with acetic acid promoter—In order to demonstrate the criticality for the promoter component in this reaction, the following reaction was performed in the absence of a $C_2$ to $C_4$ carboxylic acid.

A four liter glass reaction vessel was sparged with nitrogen and charged with 395 grams (0.94 moles) of a linear C20-28 alkylphenol, 395 grams (1.51 moles) of a branched C12 alkylphenol, 71 grams (0.95 moles) glycine, 144 grams (1.95 moles) calcium hydroxide, 1100 grams of a 100N group I diluent oil, 120 grams of 2-ethylhexanol, 170 grams of ethylene glycol and 2 drops of foam inhibitor. The reactor was agitated at 800 rpm, and maintained at 14.21 psia under nitrogen. The temperature was ramped to 190° C. in 2.25 hrs; water removal began just above 100° C. The mixture was held at 190° C. for 1 hr.

After one hour, the heater was lowered, and 170 mls of room temperature 2-ethylhexanol was pumped into the reactor via peristaltic pump. The mixture was cooled to 70° C. so that it could be safely opened and 47 grams (1.49 moles) of paraformaldehyde added. The stopper was replaced, and the reactor was ramped to 220° in 2.5 hrs; note that the ramp had to be held at 187° for about half an hour to prevent excessive foaming.

Upon reaching 225° C., distillation was commenced. Initially, vacuum had to be applied very gradually to avoid excessive foaming, and the temperature was allowed to fall to 180° C. Once we were able to hold the reactor at 220° C. and about 1 psia, we held for 0.5 hr, then broke vacuum with nitrogen. The product was cooled to 120° C. and pumped out of the reactor. A small sample was retained for measuring crude sediment, and the rest was filtered over Celite. Crude Sediment=14% so no further work was done with this product.

Comparative Example H

No Ethylene Glycol

Reaction with an alpha amino acid but without ethylene glycol promoter—In order to demonstrate the criticality for the promoter component in this reaction, the following reaction was performed in the absence of a $C_2$ to $C_6$ alkylene glycol.

A four liter glass reaction vessel was sparged with nitrogen and charged with 198 grams (0.47 moles) of a linear C20-28 alkylphenol, 198 grams (0.76 moles) of a branched C12 alkylphenol, 43 grams (0.57 moles) glycine, 6 grams (0.1 moles) acetic acid, 72 grams (0.98 moles) calcium hydroxide, 400 grams of a 100N group II diluent oil, 145 grams of 2-ethylhexanol, 38.5 grams (1.23 moles) of paraformaldehyde and 1 drop of foam inhibitor. The reactor was agitated at 800 rpm, and maintained at 14.21 psia under nitrogen. The temperature was ramped to 220° C. in 5 hrs; water removal began just above 100° C.

There was much less dehydration than normally experienced in the presence of ethylene glycol, and the product remained murky with obvious particulate matter.

Distillation commenced as soon as 220° C. was reached. Initially, vacuum had to be applied very gradually to avoid excessive foaming, and the temperature was allowed to fall to 180° C. The final product was cooled to 120° C. and the agitator was stopped so the product could be observed before pump-out. There was over an inch of solid on the bottom of the reactor; a crude-sediment measurement was not taken due to the impossibility of homogenizing the sample.

STRUCTURAL EXAMPLES

Electrospray Data for Selected Compounds

Electro-Spray Ionization (ESI) Mass Spectrometry—Mass spectrometry of "involatile" compounds was a challenge until the advent of ESI(Electro-spray Ionization). In ESI, the ionization takes place in the condensed phase. The compound(s) of interest is dissolved in a suitable solvent, the solution is then nebulized to from small droplets. The "pre-formed" ions in these droplets are then ejected, due to repulsion between these ions within the droplets, into gas phase. These ejected ions are then sampled via sampling cones, and transported into the mass spectrometer for mass analysis. ESI is a "soft" ionization, therefore, all of the ions generated are expected to be related to the molecular ions.

The ESI mass spectra were obtained on a Finnigan TSQ 3000 Mass spectrometer. The sample, approximately 0.1 mg is dissolved in approximately 3 ml of 3:1 tetrahydrofuran: water, the solution is infused into the ESI source using a syringe pump at a rate of 8 ul per minute. The mass spectrometer is scanned from 10 to 2500 AMU in two seconds. The final spectrum is the sum of 60 scans.

Alkylphenol compounds have ionizable phenol groups, therefore it was necessary to observe in the ESI mass spectra in the negative ion mode. Since the starting materials for the synthesis of the target oligomeric alkylphenol compounds were all known, the product structures were theorized. The product compounds were complex due to homologs of the alkylphenols and mixtures of the alkylphenols.

To our surprise, the hypothesized and expected Mannich products were not observed; instead, compounds with various number of the alkylphenols linked with methylene were observed. Knowing these alkylphenol species, structures were correlated to all of the relevant peaks in the ESI mass spectrum. Determination of the phenolic moieties and linked phenolics (for example: two linked phenolics θ-θ; three linked phenolics θ-θ-θ; four and higher linked phenolics θ-θ-θ-θ$^+$), were resolved and calculated from the spectra. The intensity of each peak was used to represent the concentration of the corresponding compound(s) and determination the relative concentration of these compounds in the form of area percent was undertaken. Note, that it was not possible to determine weight percent due to the lack of pure compounds needed as standards.

Elemental analysis showed the presence of nitrogen in a typical oligomeric alkylphenol compound sample; however, as mentioned above, ESI mass spectra in the negative ion mode does not show any indication of nitrogen containing compounds. However, by GCMS, using electron ionization (EI), glycine was observed. One can then speculate that the glycine moiety is associated with the active ingredient via ionic linkage. And since the active ingredient in the oligomeric alkylphenol compounds is a phenol, one then concludes that it is the ammonium part of the glycine that is associated with the alkylphenol anion. Therefore, one can expect to observe glycine in the positive mode ESI spectrum. The presence of m/z76, corresponding to the protonated glycine has never been observed in the positive ion ESI spectra. It is possible that glycine is associated with other moiety, as well as with the oligomeric alkylphenol compounds.

TABLE 3

Electro-Spray Ionization (ESI) Mass Spectrometry spectral analysis was preformed for a subset of the above Examples.

COMPUTED NUMBER OF PHENOLIC MOIETIES IN THE OLIGOMERIC ALKYLPHENOLIC COMPOSITION (relative mass % of species present)

|  | Single | Two | Three | Four and higher |
|---|---|---|---|---|
| EXAMPLE NO. | | | | |
| 1 | 2.24 | 25.03 | 27.31 | 45.42 |
| 2 | 6.41 | 35.02 | 24.53 | 34.04 |
| 3 | 7.95 | 24.8 | 29.44 | 37.81 |
| 4 | 2.56 | 39.82 | 31.38 | 26.24 |
| 5 | 7.87 | 59.54 | 22.07 | 10.52 |
| 6 | 8.63 | 45.7 | 21.57 | 24.1 |
| 7 | 8.25 | 42.59 | 24.06 | 25.1 |
| 17 | 1.7 | 41.92 | 33.24 | 23.14 |
| 18 | 2.62 | 39.69 | 26.73 | 33.96 |
| COMPARATIVE EXAMPLES | | | | |
| Comparative A | 0 | 79.34 | 15.26 | 5.4 |
| Comparative B | 14.14 | 51.13 | 22.14 | 12.59 |
| Comparative F | 9.48 | 56.01 | 13.63 | 20.88 |
| Comparative E | 10.12 | 50.68 | 20.45 | 18.75 |

STRUCTURAL EXAMPLE

Decalcification and Infrared "IR" Spectral Analysis

Decalcification—20 grams of Example 2 was dissolved in 18 grams of analytical grade hexane. Then enough anhydrous HCL/Ether (Aldrich: Hydrogen Chloride 1.0M solution in Diethyl ether) was added and mixed-in to bring the pH to just below 3 using EM Science ColorpHast pH strips—about 35 mL. Calcium chloride, calcium glycinate, and glycine (an insoluble solid) immediately precipitated out of solution. The resulting product was centrifuged, and the liquid layer removed using a pasture pipette, taking care to include as little solids as possible. Solvents were removed under a slow nitrogen flow and mild heat, taking care not to overheat. About 17 grams of product was isolated.

An IR was taken, then two thirds of the product was submitted for nitrogen analysis and one third was submitted for calcium analysis. The results and Discussion of the Elemental Analysis are below:

TABLE 4

Elemental Analysis

Calcium:

Before decalcification: 40070 ppm of Calcium
After decalcification: 252 ppm of Calcium
(98-99% removal)

Nitrogen:

Before decalcification: 7390 ppm of Nitrogen
After decalcification: 213 ppm of Nitrogen
(97-98% removal)

As evidenced by the before and after calcium analysis, decalcification was successful, leaving only residual metal. As evidenced by the before and after nitrogen analysis, glycine was similarly removed along with the calcium, thus proving that all the nitrogen (i.e., glycine) had been linked to the oligomeric phenolic backbone via an ionic calcium salt.

Discussion of the IR—the IR for Example 2 was typical, showing a strong peak at 1594.9 cm-1 for the calcium salt of glycine, but only trace free phenolic hydroxyl stretching at 3225.5 cm-1 (because the phenol is almost entirely calcified). The IR for the decalcified oligomeric phenolic shows only residual stretching in the 1600 cm-1 region for the calcified glycine, but significant free phenolic hydroxyl stretching at 3225.5 (due to the fact that phenol has been liberated).

PERFORMANCE EXAMPLES

Thermo-Oxidation Engine Oil Simulation Test
(TEOST MHT-4)

The TEOST MHT-4 is a standard lubricant industry test for the evaluation of the oxidation and carbonaceous deposit-forming characteristics of engine oils. The test is designed to simulate high temperature deposit formation in the piston ring belt area of modern engines using an instrument as described in U.S. Pat. No. 5,401,661 and U.S. Pat. No. 5,287,731, with the MHT-4 protocol being a relatively new modification to the test. Details of the test operation and specific MHT-4 conditions have been published by Selby and Florkowski in a paper entitled, "The Development of the TEOST Protocol MHT as a Bench Test of Engine Oil Piston Deposit Tendency" presented at the 12th International Colloquium Technische Akademie Esslingen, Jan. 11-13, 2000, Wilfried J. Bartz editor.

A fully formulated basestock formulation was prepared to which the different detergents were top treated to provide a total added detergent concentration of 49 millimole/kilogram. The formulated basestock employed a oil of lubricating viscosity at SAE 15W40 basestock; 8.0 wt % of a bissuccinimide dispersant post treated with ethylene carbonate, wherein the molecular weight of alkenyl group was derived from a 2300 molecular weight polyisobutylene and the alkylene polyamine was heavy polyamine (containing an average of approximately 6.5 nitrogen atoms per molecule and a Mn of from 250 to 340, suitable heavy polyamines are commercially available from Union Carbide as HPA-X) which was then post treated with ethylene carbonate at a ration of approximately 2 mole of ethylene carbonate to 1 mole of basic nitrogen of the succinimide; 0.6 wt % of a secondary alcohol ZnDTP (derived from sec-butanol and methylisobutylcarbinol); 0.7 wt % of a 17 TBN calcium sulfonate detergent characterized by having a total calcium wt % of approximately 2.35 and a kinematic viscosity at 100° C. of 30 cSt; 0.5 wt % of a hindered phenol antioxidant, namely a isooctyl-3,5-di-tert-butyl-4-hydroxyhydrocinnamate; 0.2 wt % of an oxymolybdenum complex prepared from reacting, in the presence of a polar promoter, an acidic molybdenum compound and a basic nitrogen 1000 molecular weight polyisobutenyl monosuccinimide, derived from a mixture of diethylene triamine and polyethylene amine available as E-100 polyethyleneamine from Huntsman Chemical Company as detailed in U.S. Pat. No. 6,562,765; a viscosity index improver and an antifoam agent. To this basestock, different ash detergents were added and subjected to engine testing, the results are presented below.

TABLE 5

TEOST MHT-4 bench test results

| Performance Example No. | Additive (amount in millimole/kilogram) | TEOST MHT-4 Total Deposits, milligram |
| --- | --- | --- |
| PF-1 | Example 2 (49) | 42.7 |
| PF-2 | Example 4 (49) | 66.9 |
| PF-3 | Example 7 (49) | 42.6 |
| PF-4 | Example 18 (49) | 53.3 |
| Comparative PF-A | Sulfonate A (11.2) Phenate A (37.8) | 86.6 |

Sulfonate A is a high overbased 426 TBN calcium alkyl aryl sulfonate derived from benzene and $C_{20}$-$C_{24}$ normal alpha olefins characterized by having a total calcium wt % of approximately 16.0 and a kinematic viscosity at 100° C. of 110 cSt. Phenate A is a 250 TBN alkyl phenate characterized by having at total calcium wt % of 9.25 and a kinematic viscosity at 100° C. of 230 cSt. Such alkyl phenates can be prepared according to U.S. Pat. No. 3,178,368.

As demonstrated by Performance Examples PF-1 through PF-4, the oligomeric phenolic detergent compositions of the present invention when employed in a formulated lubricating composition provided improved deposit control verses a more commonly employed phenate/sulfonate mixture.

What is claimed is:

1. A process for preparing an oligomeric phenolic detergent composition comprising contacting an oil soluble alkylphenol with an alkaline earth metal base selected from the group consisting of calcium oxide, calcium hydroxide, lime and dolomite, an alpha amino acid, and a C1 to C6 aldehyde, in the in the presence of a C2 to C6 alkylene glycol and a C2 to C4 carboxylic acid; and reacting under reactive conditions at a temperature of from about 150 C to about 225 C.

2. The process of claim 1, wherein sufficient alkaline earth metal base is present to substantially salify the oil soluble alkylphenol.

3. The process according to claim 1, wherein said process is conducted using about 0.5 to about 1.5 mole of alkaline earth metal base; 0.25 to 0.75 mole alpha amino acid; 0.55 to 1.5 mole of the C1 to C6 aldehyde; and 0.75 to 2.0 mole of the C2 to C6 alkylene glycol; on a per mole alkylphenol basis.

4. The process of claim 1, wherein the oil soluble alkylphenol is a linear or branched chain alkyl group of about 6 to 40 carbons.

5. The process of claim 1, wherein said oil soluble alkylphenol contains from 35 wt % to 85 wt % of linear alkylphenol in which the linear alkyl radical contains from 12 to 40 carbons, in mixture with from 15 wt % to 65 wt % of branched alkylphenol in which the branched chain alkyl radical contains from 9 to 24 carbon atoms.

6. The process of claim 1, wherein the alpha amino acid is selected from the group consisting of alanine, arginine, asparagine, aspartic acid, cysteine, glutamine, glutamic acid, glycine, histidine, isoleucine, leucine, lysine, methionine, phenylalanine, serine, threonine, tryptophan, tyrosine and valine.

7. The process of claim 6, wherein the alpha amino acid is selected from the group consisting of histidine, lysine and arginine.

8. The process of claim 6, wherein the alpha amino acid is selected from the group consisting of aspartic acid and glutamic acid.

9. The process of claim 6, wherein the alpha amino acid is selected from the group consisting of alanine and glycine.

10. The process of claim 1, wherein the C1 to C6 aldehyde is selected from the group consisting of paraformaldehyde, trioxane, formaldehyde solutions or formalin solutions.

11. The process of claim 10, wherein the C1 to C6 aldehyde is paraformaldehyde.

12. The process of claim 1, wherein said process is conducted in the presence of an alkanol having 8 to 16 carbon atoms.

13. The process of claim 12, further comprising distilling the reaction product to remove a portion of said alkanol.

14. The process of claim 1, wherein the oil soluble alkylphenol is contacted with the alkaline earth metal base selected from the group consisting of calcium oxide, calcium hydroxide, lime and dolomite and the alpha amino acid, in the in the presence of the C2 to C6 alkylene glycol and the C2 to C4 carboxylic acid; and then reacted under reactive conditions at a temperature of from about 150 C to about 225 C to form an intermediate product; which is subsequently contacted with the C1 to C6 aldehyde and reacted under reactive conditions at a temperature of from about 150 C to about 225 C.

15. The process of claim 1, wherein the oil soluble alkylphenol is contacted with the alkaline earth metal base selected from the group consisting of calcium oxide, calcium hydroxide, lime and dolomite, in the in the presence of the C2 to C6 alkylene glycol and the C2 to C4 carboxylic acid; and then reacted under reactive conditions at a temperature of from about 150 C to about 225 C to form an intermediate product; which is subsequently contacted with the C1 to C6 aldehyde and the alpha amino acid and reacted under reactive conditions at a temperature of from about 150 C to about 225 C.

16. The process of claim 1, wherein the oil soluble alkylphenol is contacted with the alkaline earth metal base selected from the group consisting of calcium oxide, calcium hydroxide. lime and dolomite and the C1 to C6 aldehyde, in the in the presence of the C2 to C6 alkylene glycol and the C2 to C4 carboxylic acid; and then reacted under reactive conditions at a temperature of from about 150 C to about 225 C to form an intermediate product; which is subsequently contacted with and the alpha amino acid and reacted under reactive conditions at a temperature of from about 150 C to about 225 C.

17. The process of claim 16, wherein the alpha amino acid is added with additional C1 to C6 aldehyde.

18. A process for preparing an oligomeric phenolic detergent composition comprising contacting an oil soluble alkaline earth metal phenate, an alpha amino acid, and a C1 to C6 aldehyde, in the in the presence of a C2 to C6 alkylene glycol and a C2 to C4 carboxylic acid; and reacting under reactive conditions at a temperature of from about 150 C to about 225 C.

19. A product produced according to the process of any of claims 1-18.

20. A lubricating oil composition comprising a major amount of an oil of lubricating viscosity and a minor amount of the oligomeric phenolic detergent product prepared according to claim 19.

21. A lubricating oil composition comprising: a major amount of an oil of lubricating viscosity; an oligomeric phenolic detergent composition prepared by contacting an oil soluble alkylphenol with an alkaline earth metal base selected from the group consisting of calcium oxide, calcium hydroxide, lime and dolomite, an alpha amino acid, and a C1 to C6 aldehyde, in the in the presence of a C2 to C6 alkylene glycol and a C2 to C4 carboxylic acid; and reacting under reactive conditions at a temperature of from about 150 C to about 225 C; a dispersant; and a wear inhibitor.

22. The lubricating oil composition of claim 21, wherein said composition comprises from 0.5 to 5 weight percent of the oligomeric phenolic detergent, from 1 to 12 weight percent of the dispersant and from 0.5 to 1.1 weight percent of the wear inhibitor, based on the total weight of the lubricating oil composition.

23. The lubricating oil composition of claim 22, further comprising at least one oxidation inhibitor.

24. The lubricating oil composition of claim 22, further comprising at least one viscosity index improver.

25. The lubricating oil composition of claim 22, further comprising at least one foam inhibitor.

26. The lubricating oil composition of claim 22, wherein the wear inhibitor is a zinc dithiophosphate.

27. The lubricating oil composition of claim 26, wherein said composition has a total ash content from about 0.1 to 1.2 weight percent ash as determined by ASTM D874, a total sulfur mass of from 0.05 to 0.5 weight percent and a total phosphorous mass of from 0.02 to 0.1 weight percent, based on the total weight percent of the lubricating oil composition.

* * * * *